US012432604B2

(12) United States Patent
Li et al.

(10) Patent No.: US 12,432,604 B2
(45) Date of Patent: Sep. 30, 2025

(54) SIDELINK CARRIER AGGREGATION

(71) Applicant: QUALCOMM Incorporated, San Diego, CA (US)

(72) Inventors: Qing Li, Princeton Junction, NJ (US); Junyi Li, Fairless Hills, PA (US); Hong Cheng, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 657 days.

(21) Appl. No.: 17/810,810

(22) Filed: Jul. 5, 2022

(65) Prior Publication Data
US 2024/0015558 A1    Jan. 11, 2024

(51) Int. Cl.
*H04W 28/02* (2009.01)
*H04W 8/24* (2009.01)
*H04W 92/18* (2009.01)

(52) U.S. Cl.
CPC ......... *H04W 28/0215* (2013.01); *H04W 8/24* (2013.01); *H04W 92/18* (2013.01)

(58) Field of Classification Search
None
See application file for complete search history.

(56) References Cited

U.S. PATENT DOCUMENTS

| 2012/0057560 | A1 | 3/2012 | Park et al. |
| 2019/0239112 | A1 | 8/2019 | Rao et al. |
| 2020/0053675 | A1* | 2/2020 | Khoryaev ............... H04L 5/001 |

FOREIGN PATENT DOCUMENTS

| EP | 3621252 A1 | 3/2020 |
| EP | 3662706 A1 * | 6/2020 ............ H04W 72/02 |

OTHER PUBLICATIONS

International Search Report and Written Opinion—PCT/US2023/025035—ISA/EPO—Oct. 9, 2023.

* cited by examiner

*Primary Examiner* — Suhail Khan
(74) *Attorney, Agent, or Firm* — Kevin M. Donnelly; Harrity & Harrity, LLP

(57) ABSTRACT

Various aspects of the present disclosure generally relate to wireless communication. In some aspects, a user equipment (UE) may transmit, to a network node, a first indication, associated with a sidelink communication, of at least one of whether sidelink carrier aggregation is supported or a first one or more component carriers associated with the sidelink communication. The UE may receive, from the network node based on transmitting the indication, a second indication that a transmission associated with the sidelink communication is to be duplicated for multiple component carriers. The UE may transmit, based on the second indication, the sidelink communication via each of a plurality of component carriers that include at least one component carrier from the first one or more component carriers. Numerous other aspects are provided.

30 Claims, 14 Drawing Sheets

SIDELINK CARRIER AGGREGATION

FIELD OF THE DISCLOSURE

Aspects of the present disclosure generally relate to wireless communication and specifically, to techniques and apparatuses for sidelink carrier aggregation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different UEs to communicate on a municipal, national, regional, or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

Carrier aggregation is a technology that enables two or more component carriers (CCs, sometimes referred to as carriers) to be combined (for example, into a single channel) for a single user equipment (UE) to enhance data capacity. In some examples, a UE may be configured to perform carrier aggregation for sidelink communications. In some examples, the UE may perform carrier aggregation for sidelink communications in the sidelink Mode 1 (for example, where scheduling and resource allocation is performed by a network node). Configuration parameters for a sidelink communication over a PC5 interface may be based at least in part on mapping rules. The mapping rules may involve a mapping between one or more service identifiers (for example, service types) and a Layer 2 (L2) destination identifier for a broadcast or groupcast communication or between one or more service identifiers and sidelink frequencies associated with a geographical area. Therefore, an L2 destination identifier for a groupcast or broadcast communication may be associated with multiple services (for example, multiple sidelink service types), each of which may be mapped with different frequency carriers in a geographical area. For example, some services associated with an L2 destination identifier may support legacy UEs (for example, UEs operating in accordance with Release 16 or 17 of 3GPP Technical Specifications) which do not support sidelink carrier aggregation, and other services associated with the L2 destination identifier may support new UEs (for example, UEs operating in accordance with Release 18 or beyond of 3GPP Technical Specifications) which do support sidelink carrier aggregation.

For a groupcast or broadcast communication associated with an L2 destination identifier, a packet transmitted on a component carrier selected for, or by, a UE supporting sidelink carrier aggregation, may not be received by UEs not supporting sidelink carrier aggregation when the selected carrier is not used or supported by the UEs not supporting sidelink carrier aggregation. As another example, some UEs may be associated with reduced capabilities. For example, some UEs may be unable to support all frequency carriers associated with a given L2 destination identifier due to a reduced or limited capability of the UEs. Therefore, if a selected carrier for a transmission of a groupcast or broadcast communication associated with an L2 destination identifier is not supported by the reduced capability UE, then the reduced capability UE may be unable to receive the groupcast or broadcast communication.

In other words, a first UE supporting sidelink carrier aggregation may be scheduled to transmit groupcast or broadcast communication associated with an L2 destination identifier using one or more of a set of component carriers. A second UE not supporting sidelink carrier aggregation may be configured to receive sidelink communications using a single component carrier (for example, that is included in the set of component carriers). However, if a network node, or the first UE, does not select the single component carrier to be used for a transmission of the groupcast or broadcast communication, then the second UE may not receive the groupcast or broadcast communication. Because the first UE or the network node may be unaware of the capability of the second UE related to sidelink carrier aggregation, the first UE or the network node may not select the component carrier used by the second UE. As a result, a backward compatibility issue may arise for sidelink carrier aggregation.

SUMMARY

Some aspects described herein relate to a UE for wireless communication. The user equipment may include at least one memory and at least one processor communicatively coupled to the at least one memory. The at least one processor may be configured to cause the UE to transmit, to a network node, a first indication, associated with a sidelink communication, of at least one of whether sidelink carrier aggregation is supported or a first one or more component carriers associated with the sidelink communication. The at least one processor may be configured to cause the UE to receive, from the network node based on transmitting the indication, a second indication that a transmission associated with the sidelink communication is to be duplicated for multiple component carriers. The at least one processor may be configured to cause the UE to transmit, based on the second indication, the sidelink communication via each of a plurality of component carriers that include at least one component carrier from the first one or more component carriers.

Some aspects described herein relate to a network node for wireless communication. The network node may include at least one memory and at least one processor communicatively coupled to the at least one memory. The at least one processor may be configured to cause the network node to receive one or more indications, associated with a sidelink communication and one or more UEs, of at least one of whether sidelink carrier aggregation is supported or a first one or more component carriers associated with the sidelink communication. The at least one processor may be configured to cause the network node to transmit a communication intended for a UE of the one or more UEs indicating that a transmission associated with the sidelink communication is to be duplicated for multiple component carriers, the multiple component carriers including at least one component carrier from the first one or more component carriers.

Some aspects described herein relate to a method of wireless communication performed by a UE. The method may include transmitting, to a network node, a first indication, associated with a sidelink communication, of at least one of whether sidelink carrier aggregation is supported or a first one or more component carriers associated with the sidelink communication. The method may include receiving, from the network node based on transmitting the indication, a second indication that a transmission associated with the sidelink communication is to be duplicated for multiple component carriers. The method may include transmitting, based on the second indication, the sidelink communication via each of a plurality of component carriers that include at least one component carrier from the first one or more component carriers.

Some aspects described herein relate to a method of wireless communication performed by a network node. The method may include receiving one or more indications, associated with a sidelink communication and one or more UEs, of at least one of whether sidelink carrier aggregation is supported or a first one or more component carriers associated with the sidelink communication. The method may include transmitting a communication intended for a UE of the one or more UEs indicating that a transmission associated with the sidelink communication is to be duplicated for multiple component carriers, the multiple component carriers including at least one component carrier from the first one or more component carriers.

Some aspects described herein relate to a non-transitory computer-readable medium that stores a set of instructions for wireless communication by a UE. The set of instructions, when executed by one or more processors of the UE, may cause the UE to transmit, to a network node, a first indication, associated with a sidelink communication, of at least one of whether sidelink carrier aggregation is supported or a first one or more component carriers associated with the sidelink communication. The set of instructions, when executed by one or more processors of the UE, may cause the UE to receive, from the network node based on transmitting the indication, a second indication that a transmission associated with the sidelink communication is to be duplicated for multiple component carriers. The set of instructions, when executed by one or more processors of the UE, may cause the UE to transmit, based on the second indication, the sidelink communication via each of a plurality of component carriers that include at least one component carrier from the first one or more component carriers.

Some aspects described herein relate to a non-transitory computer-readable medium that stores a set of instructions for wireless communication by a network node. The set of instructions, when executed by one or more processors of the network node, may cause the network node to receive one or more indications, associated with a sidelink communication and one or more UEs, of at least one of whether sidelink carrier aggregation is supported or a first one or more component carriers associated with the sidelink communication. The set of instructions, when executed by one or more processors of the network node, may cause the network node to transmit a communication intended for a UE of the one or more UEs indicating that a transmission associated with the sidelink communication is to be duplicated for multiple component carriers, the multiple component carriers including at least one component carrier from the first one or more component carriers.

Some aspects described herein relate to an apparatus for wireless communication. The apparatus may include means for transmitting, to a network node, a first indication, associated with a sidelink communication, of at least one of whether sidelink carrier aggregation is supported or a first one or more component carriers associated with the sidelink communication. The apparatus may include means for receiving, from the network node based on transmitting the indication, a second indication that a transmission associated with the sidelink communication is to be duplicated for multiple component carriers. The apparatus may include means for transmitting, based on the second indication, the sidelink communication via each of a plurality of component carriers that include at least one component carrier from the first one or more component carriers.

Some aspects described herein relate to an apparatus for wireless communication. The apparatus may include means for receiving one or more indications, associated with a sidelink communication and one or more UEs, of at least one of whether sidelink carrier aggregation is supported or a first one or more component carriers associated with the sidelink communication. The apparatus may include means for transmitting a communication intended for a UE of the one or more UEs indicating that a transmission associated with the sidelink communication is to be duplicated for multiple component carriers, the multiple component carriers including at least one component carrier from the first one or more component carriers.

Aspects generally include a method, apparatus, system, computer program product, non-transitory computer-readable medium, user equipment, base station, network node, network entity, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
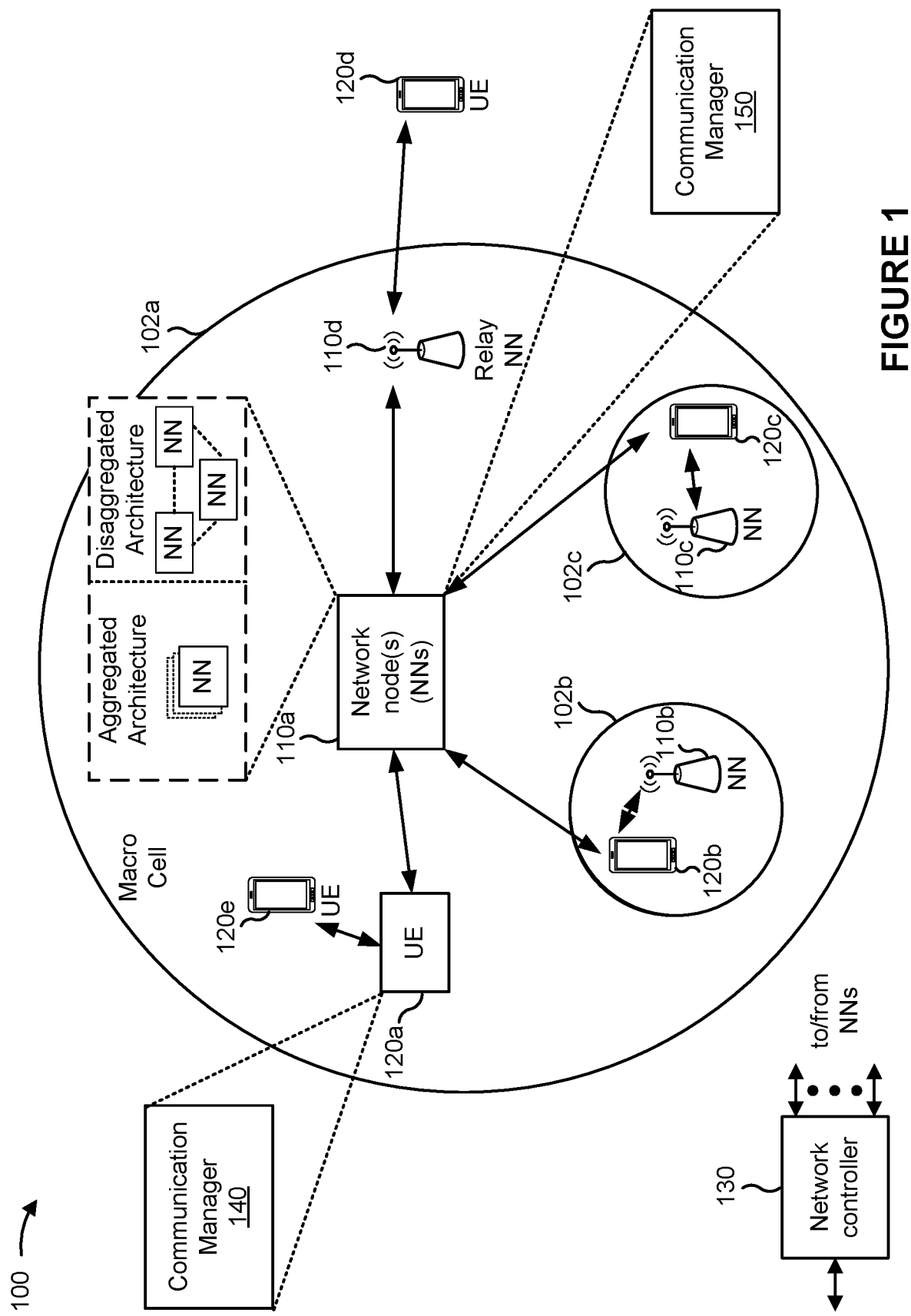
FIG. 1 is a diagram illustrating an example of a wireless network in accordance with the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to sidelink carrier aggregation. Some aspects more specifically relate to a user equipment (UE) transmitting, to a network node, an indication of at least one of 1) whether sidelink carrier aggregation is supported (for example, for a sidelink communication or for a sidelink service or service type); or 2) one or more component carriers associated with a sidelink communication (for example, one or more component carriers supported by the UE). As used herein, a "sidelink communication" may refer to one or more sidelink packets or information associated with a given Layer 2 (L2) destination identifier. The sidelink communication may be duplicated based at least in part on a cast type (for example, broadcast or groupcast) and one or more indications obtained by the UE from an upper layer (for example, an application layer). The one or more indications from the upper layer may indicate whether respective service types support or do not support sidelink carrier aggregation for an L2 destination identifier associated with the sidelink communication. The upper layer may indicate, to an access stratum (AS) layer, for example, a plurality of transmit (Tx) profiles (for example, each indicating at least one of 1) whether sidelink carrier aggregation is supported, or 2) one or more associated component carriers for a sidelink communication) associated with the L2 destination identifier. Alternatively, the upper layer may indicate, to the AS layer, only one Tx profile (again, for example, indicating at least one of 1) whether sidelink carrier aggregation is supported, or 2) one or more associated component carriers for a sidelink communication) associated with the L2 destination identifier. The UE may transmit the indication to the network node (for example, indicating 1) whether sidelink carrier aggregation is supported; or 2) the one or more component carriers associated with a sidelink communication) based at least in part on the one or more indications obtained from the upper layer.

In some aspects, to support backward compatibility for a sidelink carrier aggregation feature (for example, that may be supported by some UEs and not supported by other UEs), a sidelink communication may be duplicated on multiple component carriers. Knowledge of a UE's capability for sidelink carrier aggregation or of one or more component carriers supported by the UE for a sidelink communication may enable a network node (for example, for sidelink Mode 1 scheduling) to determine whether the sidelink communication (for example, associated with a given L2 destination identifier) is to be duplicated on multiple component carriers. For example, a network node may determine that the sidelink communication is to be duplicated on multiple component carriers based at least in part on a first one or more component carriers (for example, supported by a first UE or a first service type associated with the sidelink communication) and a second one or more component carriers (for example, supported by a second UE or a second service type associated with the sidelink communication) being mutually exclusive (for example, based on the first one or more component carriers and the second one or more component carriers including no common component carriers). In some aspects, the network node may transmit, to the first UE, an indication that a transmission associated with the sidelink communication is to be duplicated on multiple component carriers. In some examples, the indication may include an indication of a plurality of component carriers, including at least one component carrier from the first one or more component carriers, on which the sidelink communication is to be duplicated. In some examples, the first UE may then transmit the sidelink communication via each of the plurality of component carriers.

Particular aspects of the subject matter described in this disclosure can be implemented to realize one or more of the following potential advantages. In some examples, the described techniques can be used to enable backward compatibility for sidelink communications that are associated with carrier aggregation. For example, a UE may transmit a sidelink communication where the sidelink communication is duplicated on multiple component carriers. The multiple component carriers may be selected (for example, by a network node) to ensure that the multiple component carriers include at least one component carrier that is supported by UEs in the wireless network that do not support sidelink carrier aggregation or UEs that have a limited capability related to component carriers supported by the UEs. As a result, a likelihood that a sidelink communication transmitted by a UE that supports sidelink carrier aggregation is received by UEs that do not support sidelink carrier aggregation or UEs associated with a reduced capability for supported component carriers may be increased.

FIG. 1 is a diagram illustrating an example of a wireless network in accordance with the present disclosure. The wireless network 100 may be or may include elements of a 5G (for example, NR) network or a 4G (for example, Long Term Evolution (LTE)) network, among other examples. The wireless network 100 may include one or more network nodes 110 (shown as a network node (NN) 110a, a network node 110b, a network node 110c, and a network node 110d), a UE 120 or multiple UEs 120 (shown as a UE 120a, a UE 120b, a UE 120c, a UE 120d, and a UE 120e), or other network entities. A network node 110 is an entity that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, or one or more DUs. A network node 110 may include, for example, an NR network node, an LTE network node, a Node B, an eNB (for example, in 4G), a gNB (for example, in 5G), an access point, or a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, or backhaul interfaces, such as a direct physical connection, an air interface, or a virtual network, using any suitable transport network.

Each network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used.

A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node.

The wireless network 100 may be a heterogeneous network that includes network nodes 110 of different types, such as macro network nodes, pico network nodes, femto network nodes, or relay network nodes. These different types of network nodes 110 may have different transmit power levels, different coverage areas, or different impacts on interference in the wireless network 100. For example, macro network nodes may have a high transmit power level (for example, 5 to 40 watts) whereas pico network nodes, femto network nodes, and relay network nodes may have lower transmit power levels (for example, 0.1 to 2 watts). In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (for example, three) cells. In some examples, a cell may not necessarily be stationary, and the geographic area of the cell may move according to the location of a network node 110 that is mobile (for example, a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

A network controller 130 may couple to or communicate with a set of network nodes 110 and may provide coordination and control for these network nodes 110. The network controller 130 may communicate with the network nodes 110 via a backhaul communication link. The network nodes 110 may communicate with one another directly or indirectly via a wireless or wireline backhaul communication link. In some aspects, the network controller 130 may be a CU or a core network device, or the network controller 130 may include a CU or a core network device.

In some examples, a cell may not necessarily be stationary, and the geographic area of the cell may move in accordance with the location of a network node 110 that is mobile (for example, a mobile network node). In some examples, the network nodes 110 may be interconnected to one another or to one or more other network nodes 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a network node 110 or a UE 120) and send a transmission of the data to a downstream station (for example, a UE 120 or a network node 110). A relay station may be a UE 120 that can relay transmissions for other UEs 120. In the example shown in FIG. 1, the network node 110d (for example, a relay network node) may communicate with the network node 110a (for example, a macro network node) and the UE 120d in order to facilitate communication between the network node 110a and the UE 120d. A network node 110 that relays communications may be referred to as a relay station, a relay network node, or a relay.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any quantity of wireless networks 100 may be deployed in a given geographic area. Each wireless network 100 may support a particular radio access technology (RAT) and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120e) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110.

In some aspects, actions described herein as being performed by a network node 110 may be performed by multiple different network nodes. For example, configuration actions may be performed by a first network node (for example, a CU or a DU), and radio communication actions may be performed by a second network node (for example, a DU or an RU).

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "Sub-6 GHz" band in various documents and articles. A similar nomenclature issue sometimes occurs in connection with FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, the term "sub-6 GHz," if used herein, may broadly represent frequencies that may be less than 6 GHz, may be within FR1, or may include mid-band frequencies. Further, unless specifically stated otherwise, the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may transmit, to a network node, a first indication, associated with a sidelink communication, of at least one of whether sidelink carrier aggregation is supported or a first one or more component carriers associated with the sidelink communication; receive, from the network node based on transmitting the first indication, a second indication that a transmission associated with the sidelink communication is to be duplicated for multiple component carriers; and transmit, based on the second indication, the sidelink communication via each of a plurality of component carriers that include at least one component carrier from the first one or more component carriers. Additionally or alternatively, the communication manager 140 may perform one or more other operations described herein.

In some aspects, the network node 110 may include a communication manager 150. As described in more detail elsewhere herein, the communication manager 150 may receive one or more indications, associated with a sidelink communication and one or more UEs, of at least one of whether sidelink carrier aggregation is supported or a first one or more component carriers associated with the sidelink communication; and transmit a communication intended for a UE of the one or more UEs indicating that a transmission associated with the sidelink communication is to be duplicated for multiple component carriers, the multiple component carriers including at least one component carrier from the first one or more component carriers. Additionally or alternatively, the communication manager 150 may perform one or more other operations described herein.

Figure 2:
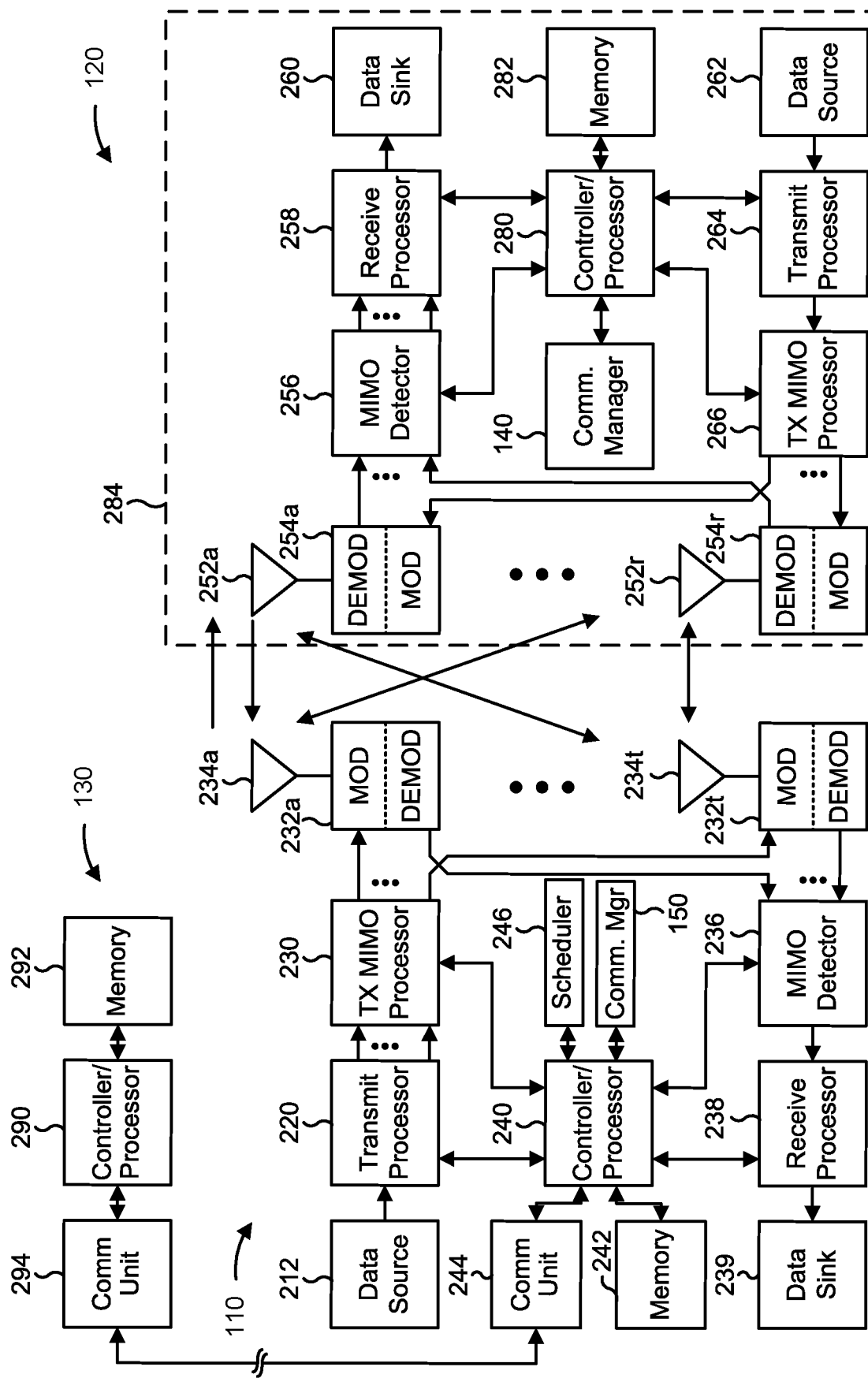
FIG. 2 is a diagram illustrating an example network node in communication with a user equipment (UE) in a wireless network in accordance with the present disclosure.

FIG. 2 is a diagram illustrating an example network node in communication with a UE in a wireless network in accordance with the present disclosure. The network node may correspond to the network node 110 of FIG. 1. Similarly, the UE may correspond to the UE 120 of FIG. 1. The network node 110 may be equipped with a set of antennas 234a through 234t, such as T antennas (T≥1). The UE 120 may be equipped with a set of antennas 252a through 252r, such as R antennas (R≥1). The network node 110 of depicted in FIG. 2 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (for example, encode and modulate) the data for the UE 120 based at least in part on the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the network node 110 or other network nodes 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize)

a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the methods described herein.

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the methods described herein.

The controller/processor 240 of the network node 110, the controller/processor 280 of the UE 120, or any other component(s) of FIG. 2 may perform one or more techniques associated with sidelink carrier aggregation, as described in more detail elsewhere herein. For example, the controller/processor 240 of the network node 110, the controller/processor 280 of the UE 120, or any other component(s) of FIG. 2 may perform or direct operations of, for example, process 1100 of FIG. 11, process 1200 of FIG. 12, or other processes as described herein. The memory 242 and the memory 282 may store data and program codes for the network node 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network node 110 or the UE 120, may cause the one or more processors, the UE 120, or the network node 110 to perform or direct operations of, for example, process 1100 of FIG. 11, process 1200 of FIG. 12, or other processes as described herein. In some examples, executing instructions may include running the instructions, converting the instructions, compiling the instructions, or interpreting the instructions, among other examples.

In some aspects, the UE 120 includes means for transmitting, to a network node, a first indication, associated with a sidelink communication, of at least one of whether sidelink carrier aggregation is supported or a first one or more component carriers associated with the sidelink communication; means for receiving, from the network node based on transmitting the first indication, a second indication that a transmission associated with the sidelink communication is to be duplicated for multiple component carriers; or means for transmitting, based on the second indication, the sidelink communication via each of a plurality of component carriers that include at least one component carrier from the first one or more component carriers. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for receiving one or more indications, associated with a sidelink communication and one or more UEs, of at least one of whether sidelink carrier aggregation is supported or a first one or more component carriers associated with the sidelink communication; or means for transmitting a communication intended for a UE of the one or more UEs indicating that a transmission associated with the sidelink communication is to be duplicated for multiple component carriers, the multiple component carriers including at least one component carrier from the first one or more component carriers. In some aspects, the means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (for example, an aggregated network node) may be configured to utilize a radio protocol stack that is physically or logically integrated within a single RAN node (for example, within a single device or unit). A disaggregated base station (for example, a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
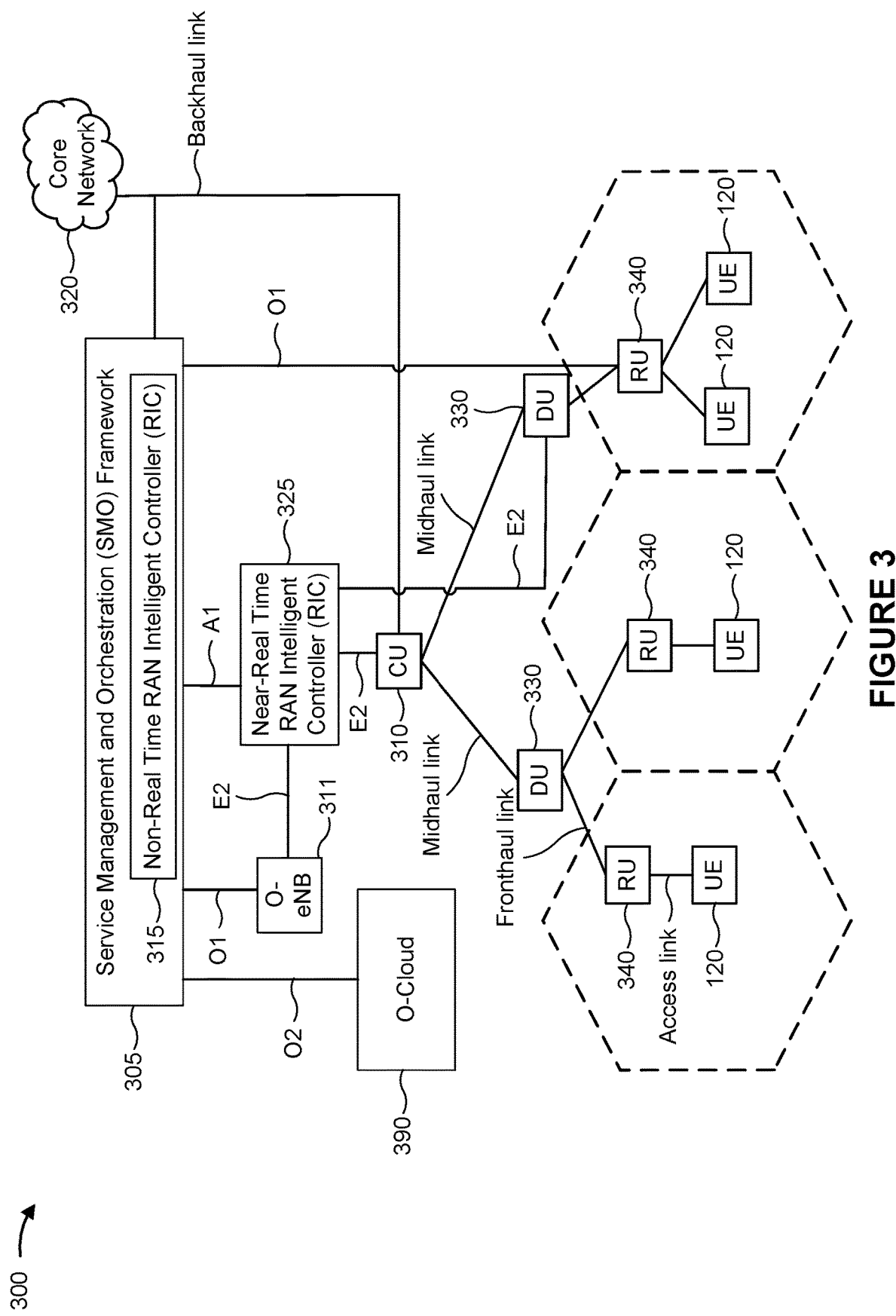
FIG. 3 is a diagram illustrating an example disaggregated base station architecture in accordance with the present disclosure.

FIG. 3 is a diagram illustrating an example disaggregated base station architecture 300 in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some examples, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit—User Plane (CU-UP) functionality), control plane functionality (for example, Central Unit—Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some examples, the DU 330 may host one or more of a radio link control (RLC) layer, a MAC layer, and one or more high physical (PHY) layers depending, at least in part, on a functional split, such as a functional split defined by the 3GPP. In some examples, the one or more high PHY layers may be implemented by one or more modules for forward error correction (FEC) encoding and decoding, scrambling, and modulation and demodulation, among other examples. In some examples, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT MC 325. The Non-RT MC 315 may be coupled to or communicate with (such as via an A1 interface) the Near-RT RIC 325. The Near-RT MC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

Figure 4:
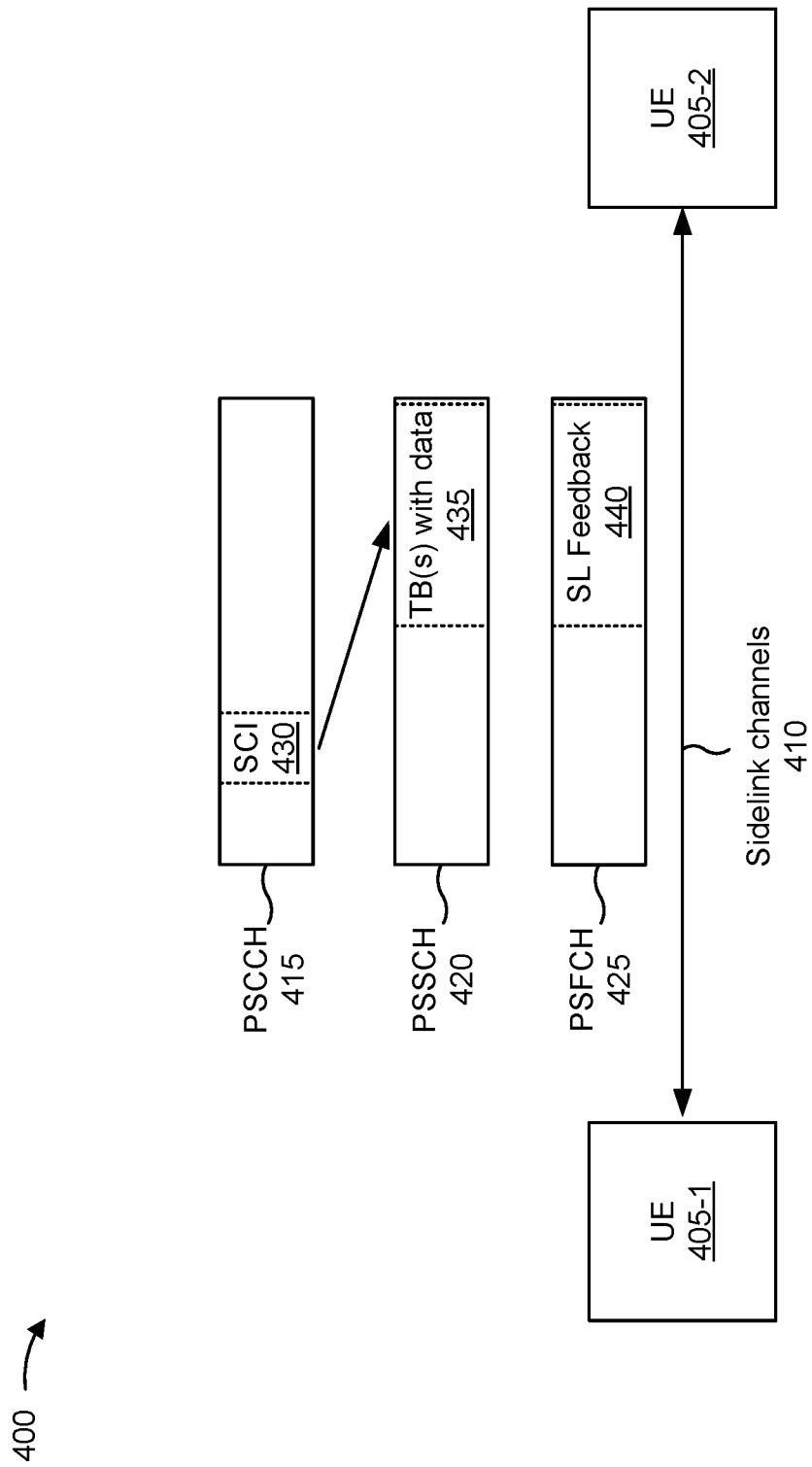
FIG. 4 is a diagram illustrating an example of sidelink communications, in accordance with the present disclosure.

FIG. 4 is a diagram illustrating an example of sidelink communications 400, in accordance with the present disclosure. As shown in FIG. 4, a first UE 405-1 may communicate with a second UE 405-2 (and one or more other UEs 405) via one or more sidelink channels 410. The UEs 405-1 and 405-2 may communicate using the one or more sidelink channels 410 for P2P communications, D2D communications, V2X communications (for example, which may include V2V communications, V2I communications, or V2P communications) or mesh networking. In some examples, the UEs 405 (for example, UE 405-1 or UE 405-2) may correspond to one or more other UEs described elsewhere herein, such as UE 120. In some examples, the one or more sidelink channels 410 may use a PC5 interface or may operate in a high frequency band (for example, the 5.9 GHz band). Additionally or alternatively, the UEs 405 may synchronize timing of transmission time intervals (TTIs) (for example, frames, subframes, slots, or symbols) using global navigation satellite system (GNSS) timing.

As further shown in FIG. 4, the one or more sidelink channels 410 may include a physical sidelink control channel (PSCCH) 415, a physical sidelink shared channel (PSSCH) 420, or a physical sidelink feedback channel (PSFCH) 425. The PSCCH 415 may be used to communicate control information, similar to a physical downlink control channel (PDCCH) or a physical uplink control channel (PUCCH) used for cellular communications with a network node 110 via an access link or an access channel. The PSSCH 420 may be used to communicate data, similar to a physical downlink shared channel (PDSCH) or a physical uplink shared channel (PUSCH) used for cellular communications with a network node 110 via an access link or an access channel. For example, the PSCCH 415 may carry sidelink control information (SCI) 430, which may indicate various control information used for sidelink communications, such as one or more resources (for example, time resources, frequency resources, or spatial resources) where a transport block (TB) 435 may be carried on the PSSCH 420. The TB 435 may include data. The PSFCH 425 may be used to communicate sidelink feedback 440, such as hybrid automatic repeat request (HARQ) feedback (for example, acknowledgement (ACK) or negative acknowledgement (NACK) (ACK/NACK) information), transmit power control (TPC), or a scheduling request (SR).

Although shown on the PSCCH 415, in some examples, the SCI 430 may include multiple communications in different stages, such as a first stage SCI (SCI-1) and a second stage SCI (SCI-2). The SCI-1 may be transmitted on the PSCCH 415. The SCI-2 may be transmitted on the PSSCH 420. The SCI-1 may include, for example, an indication of one or more resources (for example, time resources, frequency resources, or spatial resources) reserved for the PSSCH 420, information for decoding sidelink communications on the PSSCH, a quality of service (QoS) priority value, a resource reservation period, a PSSCH DMRS pattern, an SCI format for the SCI-2, a beta offset for the SCI-2, a quantity of PSSCH DMRS ports, or an MCS. The SCI-2 may include information associated with data transmissions on the PSSCH 420, such as a HARQ process ID, a new data indicator (NDI), a source identifier, a destination identifier, or a channel state information (CSI) report trigger.

In some examples, the one or more sidelink channels 410 may use resource pools. For example, a scheduling assignment (for example, included in SCI 430) may be transmitted in sub-channels using specific resource blocks (RBs) across time. In some examples, data transmissions (for example, on the PSSCH 420) associated with a scheduling assignment may occupy adjacent RBs in the same slot as the scheduling assignment (for example, using frequency division multiplexing).

In some examples, a UE 405 may operate using a sidelink transmission mode (for example, Mode 1) where resource selection or scheduling is performed by a network node 110 (for example, a base station, a CU, or a DU). For example, the UE 405 may receive a grant (for example, in downlink control information (DCI) or in an RRC message, such as for configured grants) from the network node 110 (for example, directly or via one or more network nodes) for sidelink channel access or scheduling. In some examples, a UE 405 may operate using a transmission mode (for example, Mode 2) where resource selection or scheduling is performed by the UE 405 (for example, rather than a network node 110). In some examples, the UE 405 may perform resource selection or scheduling by sensing channel availability for transmissions. For example, the UE 405 may measure an RSSI parameter (for example, a sidelink-RSSI (S-RSSI) parameter) associated with various sidelink channels, may measure an RSRP parameter (for example, a PSSCH-RSRP parameter) associated with various sidelink channels, or may measure an RSRQ parameter (for example, a PSSCH-RSRQ parameter) associated with various sidelink channels, and may select a channel for transmission of a sidelink communication based at least in part on the measurement(s).

Additionally or alternatively, the UE 405 may perform resource selection or scheduling using SCI 430 received in the PSCCH 415, which may indicate occupied resources or channel parameters. Additionally or alternatively, the UE 405 may perform resource selection or scheduling by determining a channel busy ratio (CBR) associated with various sidelink channels, which may be used for rate control (for example, by indicating a maximum quantity of resource blocks that the UE 405 can use for a particular set of subframes).

In the transmission mode where resource selection or scheduling is performed by a UE 405, the UE 405 may generate sidelink grants, and may transmit the grants in SCI 430. A sidelink grant may indicate, for example, one or more parameters (for example, transmission parameters) to be used for an upcoming sidelink transmission, such as one or more resource blocks to be used for the upcoming sidelink transmission on the PSSCH 420 (for example, for TB s 435), one or more subframes to be used for the upcoming sidelink transmission, or an MCS to be used for the upcoming sidelink transmission. In some examples, a UE 405 may generate a sidelink grant that indicates one or more parameters for semi-persistent scheduling (SPS), such as a periodicity of a sidelink transmission. Additionally or alternatively, the UE 405 may generate a sidelink grant for event-driven scheduling, such as for an on-demand sidelink message.

Figure 5:
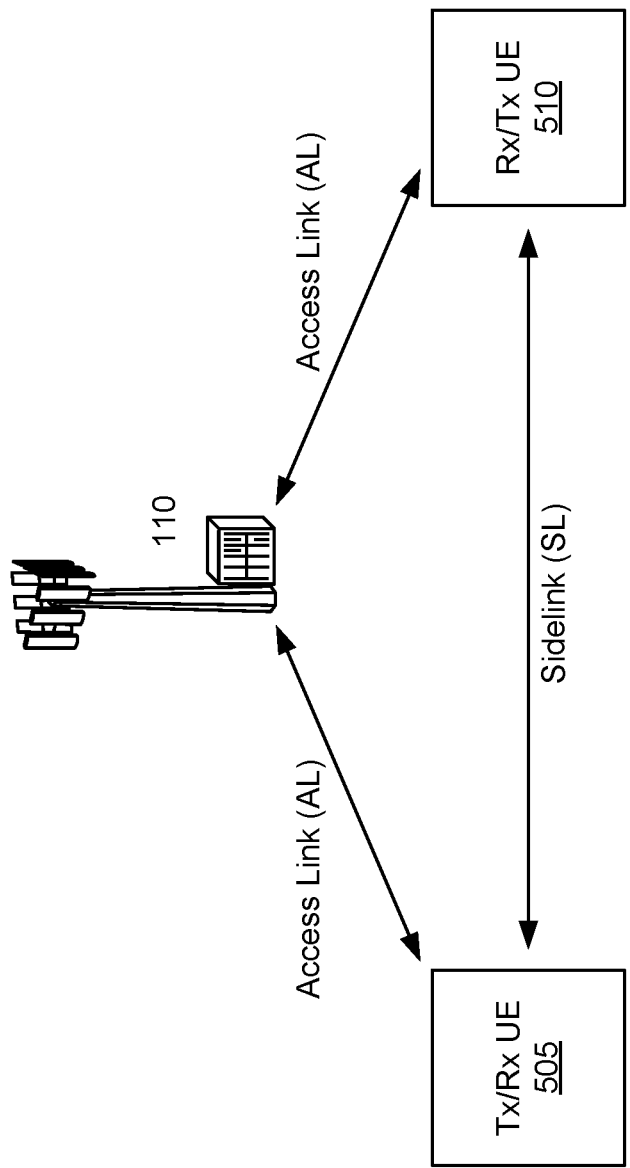
FIG. 5 is a diagram illustrating an example of sidelink communications and access link communications, in accordance with the present disclosure.

FIG. 5 is a diagram illustrating an example of sidelink communications and access link communications 500, in accordance with the present disclosure. As shown in FIG. 5, a transmitter (Tx)/receiver (Rx) UE 505 and an Rx/Tx UE 510 may communicate with one another via a sidelink, as described above in connection with FIG. 4.

As further shown, in some sidelink modes, a network node 110 may communicate with the Tx/Rx UE 505 (for example, directly or via one or more network nodes), such as via a first access link. Additionally or alternatively, in some sidelink modes, the network node 110 may communicate with the Rx/Tx UE 510 (for example, directly or via one or more network nodes), such as via a first access link. The Tx/Rx UE 505 or the Rx/Tx UE 510 may correspond to one or more UEs described elsewhere herein, such as the UE 120 of FIG. 1. Thus, a direct link between UEs 120 (for example, via a PC5 interface) may be referred to as a sidelink, and a direct link between a network node 110 and a UE 120 (for example, via a Uu interface) may be referred to as an access link. Sidelink communications may be transmitted via the sidelink, and access link communications may be transmitted via the access link. An access link communication may be either a downlink communication (from a network node 110 to a UE 120) or an uplink communication (from a UE 120 to a network node 110).

Figure 6:
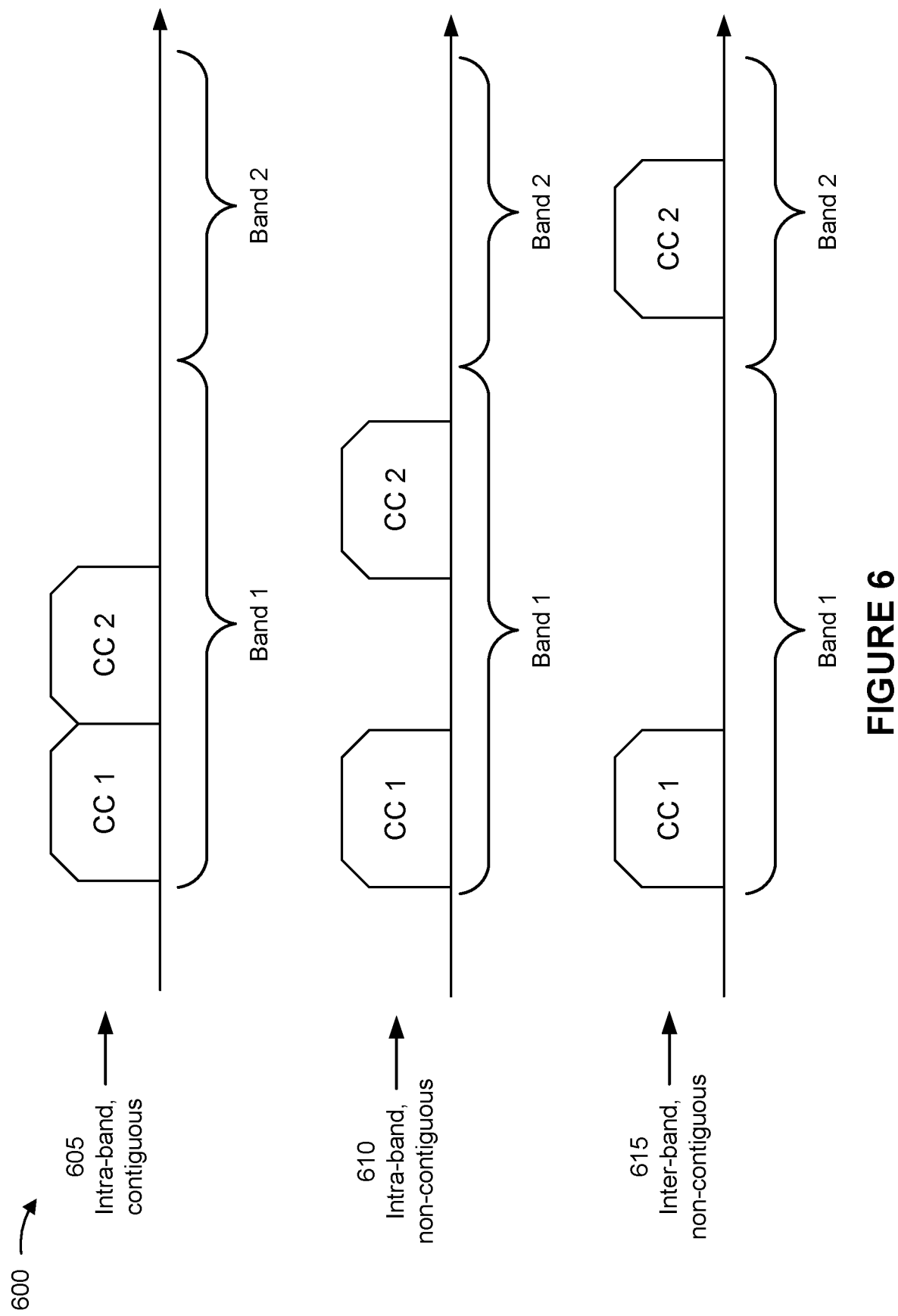
FIG. 6 is a diagram illustrating examples of carrier aggregation, in accordance with the present disclosure.

FIG. 6 is a diagram illustrating examples of carrier aggregation 600, in accordance with the present disclosure. Carrier aggregation is a technology that enables two or more component carriers (CCs, sometimes referred to as carriers) to be combined (for example, into a single channel) for a single UE 120 to enhance data capacity. As shown, carriers can be combined in the same or different frequency bands. Additionally or alternatively, contiguous or non-contiguous carriers can be combined. A network node 110 may configure carrier aggregation for a UE 120, such as in an RRC message, DCI, or another signaling message.

In some examples, carrier aggregation may be configured in an intra-band contiguous mode 605 where the aggregated carriers are contiguous to one another and are in the same band. In some examples, carrier aggregation may be configured in an intra-band non-contiguous mode 610 where the aggregated carriers are non-contiguous to one another and are in the same band. In some examples, carrier aggregation may be configured in an inter-band non-contiguous mode 615 where the aggregated carriers are non-contiguous to one another and are in different bands.

In carrier aggregation on Uu interface, a UE 120 may be configured with a primary carrier or primary cell (PCell) and one or more secondary carriers or secondary cells (SCells). In some examples, the primary carrier may carry control information (for example, downlink control information or scheduling information) for scheduling data communications on one or more secondary carriers, which may be referred to as cross-carrier scheduling. In some examples, a carrier (for example, a primary carrier or a secondary carrier) may carry control information for scheduling data communications on the carrier, which may be referred to as self-carrier scheduling or carrier self-scheduling or in-carrier scheduling.

In some examples, a UE 120 may be configured to perform carrier aggregation for sidelink communications. For example, the UE 120 may transmit sidelink communications using a PCell and one or more SCells in a similar manner as described above. In some examples, the UE 120 may perform carrier aggregation for sidelink communications in the sidelink Mode 1 (for example, where scheduling and resource allocation is performed by a network node 110). Additionally or alternatively, the UE 120 may perform carrier aggregation for sidelink communications in the sidelink Mode 2 (for example, where scheduling and resource allocation is performed by the UE 120).

Figure 7:
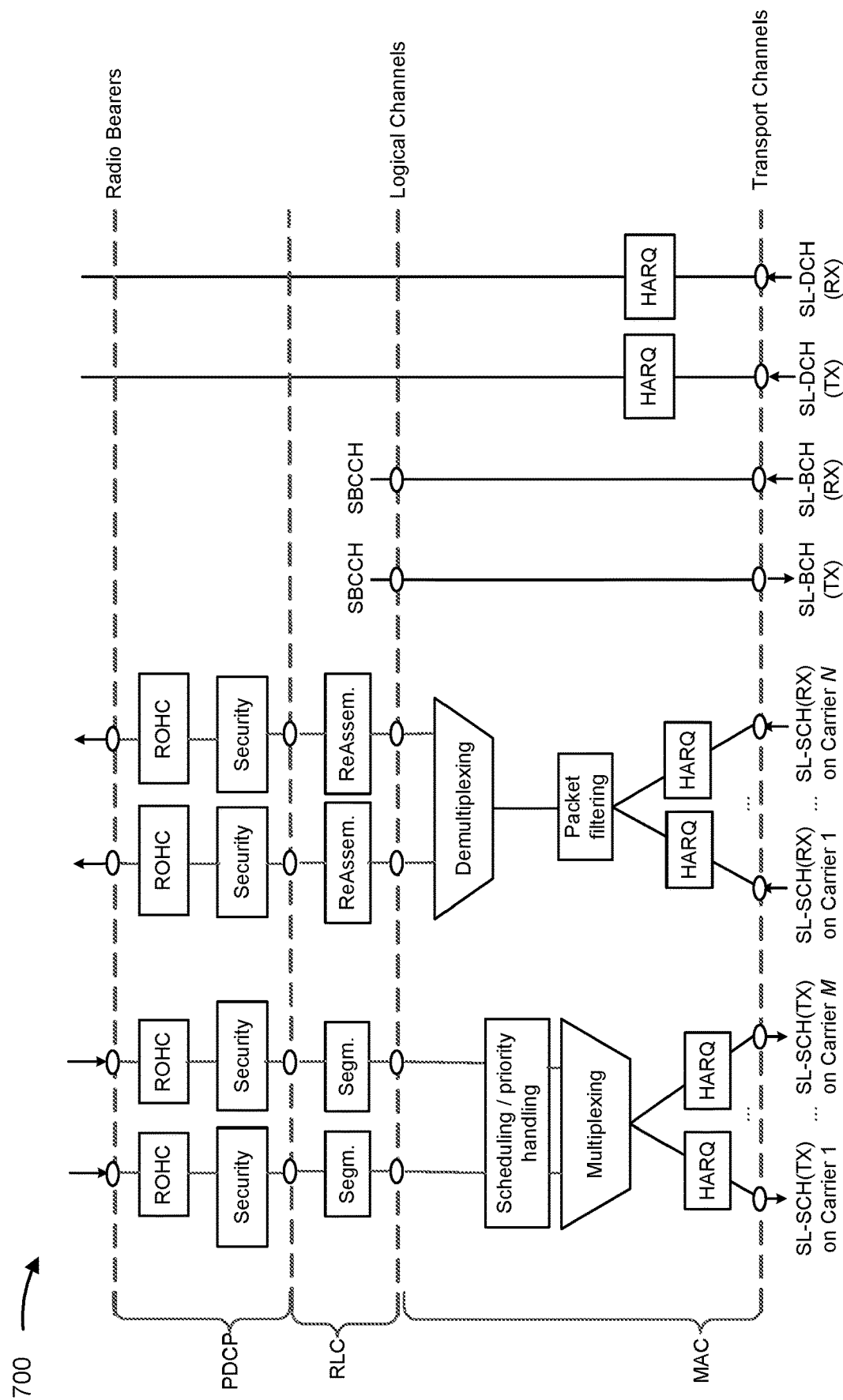
FIG. 7 is a diagram illustrating an example of sidelink carrier aggregation, in accordance with the present disclosure.

FIG. 7 is a diagram illustrating an example of sidelink carrier aggregation 700, in accordance with the present disclosure. Carrier aggregation on a PC5 interface (for example, a sidelink interface) may be implemented to LTE V2X. One independent HARQ entity per carrier may be used for V2X sidelink communication. Each transport block and corresponding potential HARQ retransmissions may be mapped to a single carrier. Multiple transport blocks may be transmitted in parallel on different carriers for a throughput gain. Sidelink carrier aggregation in resource allocation mode 3 using a dynamic grant may include a carrier indication field (CIF) (for example, a carrier index of a configured carrier list) in DCI from a network node 110. Sidelink carrier aggregation in resource allocation mode 4 may use a sensing procedure to select resources independently on each involved carrier. The same carrier may be used for all transport blocks of the same sidelink process at least until the process triggers a resource re-selection.

As shown in FIG. 7, a sidelink shared channel (SL-SCH) for transmissions (Tx) may be associated with a plurality of carriers (for example, carrier 1 to carrier M). A MAC layer may be associated with HARQ processing, multiplexing, and scheduling and priority handling. An RLC layer may be associated with segmentation. A PDCP layer may be associated with security and robust header compression (ROHC). An SL-SCH for receptions (Rx) may be associated with a plurality of carriers (for example, carrier 1 to carrier N). The MAC layer may be associated with HARQ processing, packet filtering, and demultiplexing. The RLC layer may be associated with reassembly. The PDCP layer may be associated with security and ROHC. A sidelink broadcast channel (SL-BCH) or sidelink broadcast control channel (SBCCH) for Tx and Rx may be defined. A sidelink discovery channel (SL-DCH) for Tx and Rx may be associated with HARQ processing. Further, implementing the sidelink carrier aggregation may involve establishing radio bearers, logical channels, and transport channels.

Configuration parameters for V2X communication over an NR PC5 interface may be based at least in part on mapping rules. The mapping rules may involve a mapping between one or more V2X service identifiers (for example, service types) and a Layer 2 (L2) destination identifier for a broadcast or groupcast communication. The mapping rules may involve a mapping between one or more V2X service identifiers or service types and V2X NR frequencies with associated geographical areas. Therefore, an L2 destination identifier for a groupcast or broadcast communication may be associated with multiple V2X services (for example, multiple sidelink service types), which may be mapped with the same or different frequency carriers in a geographical area. For example, some services associated with an L2 destination identifier may support legacy V2X UEs (for example, UEs operating in accordance with Release 16 or 17 of 3GPP Technical Specifications) which do not support sidelink carrier aggregation (for example, supporting only one carrier), and other services associated with the L2 destination identifier may support new V2X UEs (for example, UEs operating in accordance with Release 18 or beyond of 3GPP Technical Specifications) which do support sidelink carrier aggregation (for example, supporting more than one carriers).

For a groupcast or broadcast communication associated with an L2 destination identifier, a packet transmitted on a component carrier selected, for example, by a network node or by a UE supporting sidelink carrier aggregation, may not be received by UEs not supporting sidelink carrier aggregation when the selected carrier is not the carrier for the UEs not supporting sidelink carrier aggregation. As another example, some UEs may be associated with reduced capabilities. For example, some UEs may be unable to support all frequency carriers associated with a given L2 destination identifier due to a reduced or limited capability of the UEs. Therefore, if a selected carrier for a transmission of a groupcast or broadcast communication associated with an L2 destination identifier is not supported by the reduced capability UE, then the reduced capability UE may be unable to receive the groupcast or broadcast communication.

In other words, a first UE 120 supporting sidelink carrier aggregation may be configured to transmit groupcast or broadcast communication associated with an L2 destination identifier using one or more of a set of component carriers. A second UE 120 not supporting sidelink carrier aggregation may be configured to receive sidelink communications using a single component carrier (for example, that is included in the set of component carriers). However, if a network node 110, or the first UE 120, does not select the single component carrier to be used for a transmission of the groupcast or broadcast communication, then the second UE 120 may not receive the groupcast or broadcast communication. As a result, a backward compatibility issue may arise for sidelink carrier aggregation.

Various aspects relate generally to sidelink carrier aggregation. Some aspects more specifically relate to a UE transmitting, to a network node, an indication of at least one of 1) whether sidelink carrier aggregation is supported (for example, for a sidelink communication or for a sidelink service or service type); or 2) one or more component carriers associated with a sidelink communication (for example, one or more component carriers supported by the UE). As used herein, a "sidelink communication" may refer to one or more sidelink packets or information associated with a given L2 destination identifier.

The sidelink communication may be duplicated based at least in part on a cast type (for example, broadcast or groupcast) and one or more indications obtained by the UE from an upper layer (for example, an application layer). The one or more indications from the upper layer may indicate whether respective service types support or do not support sidelink carrier aggregation for an L2 destination identifier associated with the sidelink communication. The upper layer may indicate, to an access stratum (AS) layer, for example, a plurality of transmit (Tx) profiles (for example, each indicating at least one of 1) whether sidelink carrier aggregation is supported, or 2) one or more associated component carriers for a sidelink communication) associated with the L2 destination identifier. Alternatively, the upper layer may indicate, to the AS layer, only one Tx profile (again, for example, indicating at least one of 1) whether sidelink carrier aggregation is supported, or 2) one or more associated component carriers for a sidelink communication) associated with the L2 destination identifier. The UE may transmit the indication to the network node (for example, indicating 1) whether sidelink carrier aggregation is supported; or 2) the one or more component carriers associated with a sidelink communication) based at least in part on the one or more indications obtained from the upper layer.

In some aspects, to support backward compatibility for a sidelink carrier aggregation feature (for example, that may be supported by some UEs and not supported by other UEs), a sidelink communication may be duplicated on multiple component carriers. Knowledge of a UE's capability for sidelink carrier aggregation or of one or more component carriers supported by the UE for a sidelink communication may enable a network node (for example, for sidelink Mode 1 scheduling) to determine whether the sidelink communication (for example, associated with a given L2 destination identifier) is to be duplicated on multiple component carriers. For example, a network node may determine that the sidelink communication is to be duplicated on multiple component carriers based at least in part on a first one or more component carriers (for example, supported by a first UE or a first service type associated with the sidelink communication) and a second one or more component carriers (for example, supported by a second UE or a second service type associated with the sidelink communication) being mutually exclusive (for example, based on the first one or more component carriers and the second one or more component carriers including no common component carriers). In some aspects, the network node may transmit, to the first UE, an indication that a transmission associated with the sidelink communication is to be duplicated on multiple component carriers. In some examples, the indication may include an indication of a plurality of component carriers, including at least one component carrier from the first one or more component carriers, on which the sidelink communication is to be duplicated. In some examples, the first UE may then transmit the sidelink communication via each of the plurality of component carriers.

Particular aspects of the subject matter described in this disclosure can be implemented to realize one or more of the following potential advantages. In some examples, the described techniques can be used to enable backward compatibility for sidelink communications that are associated with carrier aggregation. For example, a UE may transmit a sidelink communication where the sidelink communication is duplicated on multiple component carriers. The multiple component carriers may be selected (for example, by a network node) to ensure that the multiple component carriers include at least one component carrier that is supported by UEs in the wireless network that do not support sidelink carrier aggregation or UEs that have a limited capability related to component carriers supported by the UEs. As a result, a likelihood that a sidelink communication transmitted by a UE that supports sidelink carrier aggregation is received by UEs that do not support sidelink carrier aggregation or UEs associated with a reduced capability for supported component carriers may be increased.

Figure 8:
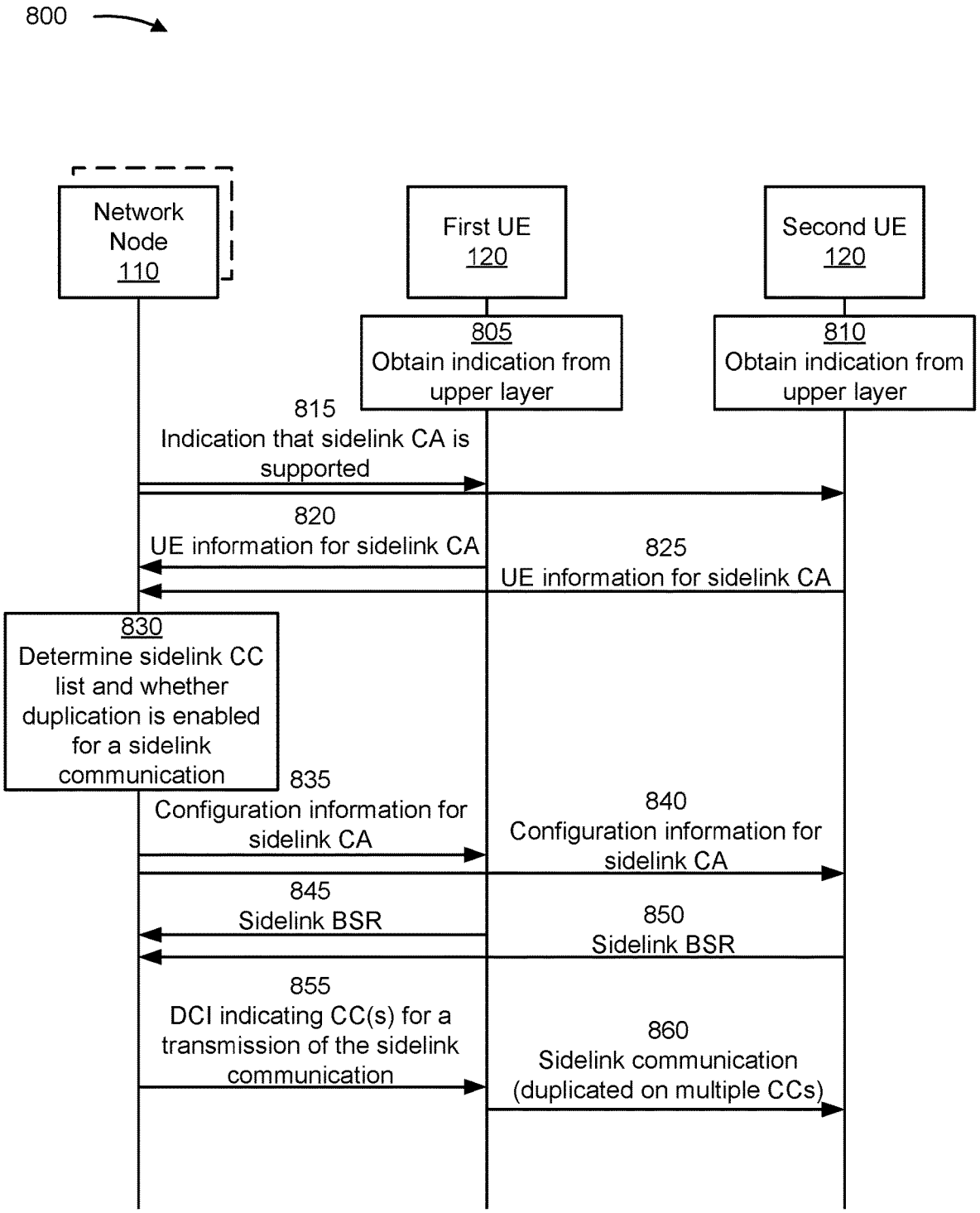
FIG. 8 is a diagram of an example associated with sidelink carrier aggregation, in accordance with the present disclosure.

FIG. 8 is a diagram of an example associated with sidelink carrier aggregation 800, in accordance with the present disclosure. As shown in FIG. 8, one or more network nodes 110 (for example, a CU, a DU, an RU, or a base station) may communicate with a first UE 120 and a second UE 120. In some aspects, the network node(s) 110, the first UE 120, and second the UE 120 may be part of a wireless network (for example, the wireless network 100). The first UE 120 and the network node 110 may have established a wireless connection prior to operations shown in FIG. 8. Similarly, the second UE 120 and the first UE 120 and the network node 110 may have established a wireless connection prior to operations shown in FIG. 8. The first UE 120 and the second UE 120 may communicate with each other using a sidelink (for example, in a similar manner as described in connection with FIGS. 4 and 5). The first UE 120 and the second UE 120 may be operating in a sidelink Mode 1 (for example, where the network node 110 performs scheduling and resource selection for sidelink communications).

As used herein, the network node 110 "transmitting" a communication to a UE 120 (for example, the first UE 120 or the second UE 120) may refer to a direct transmission (for example, from the network node 110 to the UE 120) or an indirect transmission via one or more other network nodes or devices. For example, if the network node 110 is a DU, an indirect transmission to the UE 120 may include the DU transmitting a communication to an RU and the RU transmitting the communication to the UE 120. Similarly, a UE 120 for example, the first UE 120 or the second UE 120, "transmitting" a communication to the network node 110 may refer to a direct transmission (for example, from the UE 120 to the network node 110) or an indirect transmission via one or more other network nodes or devices. For example, if the network node 110 is a DU, an indirect transmission to the network node 110 may include the UE 120 transmitting a communication to an RU and the RU transmitting the communication to the DU. References herein to "a network node 110" or "the network node 110" can, in some aspects, refer to multiple network nodes.

A protocol stack may be implemented on a UE 120 (for example, the first UE 120 or the second UE 120) or the network node 110. As used herein, "layer" may refer to a protocol stack layer. On a user plane, the UE 120 and the network node 110 may include respective PHY layers, MAC layers, RLC layers, PDCP layers, and SDAP layers. A user plane function may handle transport of user data between the UE 120 and the network node 110. On the control plane, the UE 120 and the network node 110 may include respective RRC layers. Furthermore, the UE 120 may include a non-access stratum (NAS) layer in communication with an NAS layer of an access and management mobility function (AMF). A control plane function may handle transport of control information between the UE 120 and a core network. Generally, a first layer is referred to as higher than a second layer if the first layer is further from the PHY layer than the second layer. For example, the PHY layer may be referred to as a lowest layer, and the SDAP/PDCP/RLC/MAC layer may be referred to as higher than the PHY layer and lower than the RRC layer. An application (APP) layer or a service layer may be higher than the SDAP/PDCP/RLC/MAC layer. In some cases, an entity may handle the services and functions of a given layer (for example, a PDCP entity may handle the services and functions of the PDCP layer), though the description herein refers to the layers themselves as handling the services and functions.

The RRC layer may handle communications related to configuring and operating the UE 120, such as: broadcast of system information related to the AS and the NAS; paging initiated by a 5G core network (5GC) or a next-generation radio access network (NG-RAN); establishment, maintenance, and release of an RRC connection between the UE 120 and the NG-RAN, including addition, modification, and release of carrier aggregation, as well as addition, modification, and release of dual connectivity; security functions including key management; establishment, configuration, maintenance, and release of signaling radio bearers (SRBs) and data radio bearers (DRBs); mobility functions (for example, handover and context transfer, UE cell selection and reselection and control of cell selection and reselection, inter-RAT mobility); QoS management functions; UE measurement reporting and control of the reporting; detection of and recovery from radio link failure; and NAS message transfer between the NAS layer and the lower layers of the UE 120. The RRC layer is frequently referred to as Layer 3 (L3).

The SDAP layer, PDCP layer, RLC layer, and MAC layer may be collectively referred to as Layer 2 (L2). Thus, in some cases, the SDAP, PDCP, RLC, and MAC layers are referred to as sublayers of Layer 2. The PDCP layer may provide data, in the form of PDCP protocol data units (PDUs), to the RLC layer via RLC channels. The RLC layer may handle transfer of upper layer PDUs to the MAC or PHY layers, sequence numbering independent of PDCP sequence numbering, error correction via automatic repeat requests (ARQ), segmentation and re-segmentation, reassembly of a service data unit (SDU), RLC SDU discard, and RLC re-establishment. The RLC layer may provide data, mapped to logical channels, to the MAC layer. The services and functions of the MAC layer include mapping between logical channels and transport channels (used by the PHY layer as described below), multiplexing/demultiplexing of MAC SDUs belonging to one or different logical channels into/from TB s delivered to/from the physical layer on transport channels, scheduling information reporting, error correction through HARQ, priority handling between UEs by means of dynamic scheduling, priority handling between logical channels of one UE by means of logical channel prioritization, and padding. The MAC layer may package data from logical channels into TBs, and may provide the TBs on one or more transport channels to the PHY layer. The PHY layer may handle various operations relating to transmission of a data signal, as described in more detail in connection with FIG. 2. The PHY layer is frequently referred to as Layer 1 (L1).

On the receiving side (for example, if the UE 120 is receiving a downlink communication or the network node 110 is receiving an uplink communication), the operations may be similar to those described for the transmitting side, but reversed. For example, the PHY layer may receive TBs and may provide the TBs on one or more transport channels to the MAC layer. The MAC layer may map the transport channels to logical channels and may provide data to the RLC layer via the logical channels. The RLC layer may map the logical channels to RLC channels and may provide data to the PDCP layer via the RLC channels. The PDCP layer may map the RLC channels to radio bearers and may provide data to the SDAP layer or the RRC NAS layer via the radio bearers.

Data may be passed between the layers in the form of PDUs and SDUs. An SDU is a unit of data that has been passed from a layer or sublayer to a lower layer. For example, the PDCP layer may receive a PDCP SDU. A given layer may then encapsulate the unit of data into a PDU and may pass the PDU to a lower layer. For example, the PDCP layer may encapsulate the PDCP SDU into a PDCP PDU and may pass the PDCP PDU to the RLC layer. The RLC layer may receive the PDCP PDU as an RLC SDU, may encapsulate the RLC SDU into an RLC PDU, and so on. In effect, the PDU carries the SDU as a payload.

In a first operation 805, the first UE 120 may obtain from an upper layer associated with the first UE 120, information indicating at least one of whether sidelink carrier aggregation is supported for a sidelink communication (for example, associated with a given L2 destination identifier) or one or more component carriers associated with the sidelink communication. In some aspects, the first one or more component carriers may be associated with one or more sidelink service types (for example, V2X service types). For example, the one or more indications may be passed from an upper layer (for example, an application layer or a service layer) to a lower layer (for example, an AS layer or a NAS layer) of the first UE 120.

For example, the first UE 120 may obtain one or more indications from an upper layer (for example, an application layer or a service layer, such as a V2X service layer) indicating at least one of supporting or not supporting sidelink carrier aggregation (for example, "SL-CA" or "No-SL-CA") or associated one or more component carriers based at least in part on the services or service types (supporting or not supporting sidelink carrier aggregation) associated with an L2 destination ID for a groupcast or broadcast. In some aspects, for the indication associated with indicating not supporting sidelink carrier aggregation (for example, indicating "No-SL-CA"), one or more component carriers may be indicated based at least in part on the mapping between a supported carrier and a service or service type not supporting sidelink carrier aggregation. In some aspects, for the indication associated with indicating supporting sidelink carrier aggregation (for example, indicating "SL-CA"), multiple carriers may be indicated based at least in part on the mapping between the supported component carriers and services or service types supporting sidelink carrier aggregation.

In some aspects, an indication may include a list (for example, one or more) of component carriers associated with a respective service or service type associated with the L2 destination identifier. For example, an indication from the upper layer may include one or more sidelink carriers for transmissions (for example, a sl-txcc-list1) or one or more sidelink component carriers for reception (for example, a sl-rxcc-list1), where the one or more sidelink carriers for transmissions may be same or different from the one or more sidelink component carriers for reception.

Additionally or alternatively, an indication obtained from the upper layer or a configuration (for example, preconfigured, such as in an original equipment manufacturer (OEM) configuration or configured in a configuration received by the UE 120) may indicate a UE capability associated with component carriers that are supported by the first UE 120 for the L2 destination identifier (for example, for one or more, or all, sidelink services or sidelink service types). For example, the L2 destination identifier may be associated with a set of component carriers (for example, that can be used to transmit or receive sidelink communications associated with the L2 destination identifier). An indication obtained from the upper layer (or a indicated by a preconfiguration or a configuration) may indicate a subset of component carriers, from the set of component carriers, that are supported by the first UE 120 for sidelink communications (for example, broadcast or groupcast) associated with the L2 destination identifier (for example, for one or more, or all, sidelink services or sidelink service types). In some aspects, the first UE 120 may be preconfigured (for example, by an OEM or service provider) or configured (for example, by network) or indicated (for example, via system information (SI) by network) with the list of sidelink component carriers for carrier aggregation.

In a second operation 810, the second UE 120 may obtain from an upper layer associated with the second UE 120, information indicating at least one of whether sidelink carrier aggregation is supported for a sidelink communication (for example, associated with a given L2 destination identifier) or one or more component carriers associated with the sidelink communication. For example, the second UE 120 may obtain one or more indications from the upper layer in a similar manner as described above in connection with the first operation 805. For example, the second UE 120 may obtain a list (for example, one or more) of component carriers associated with a respective service or service type associated with the L2 destination identifier. For example, an indication from the upper layer may include one or more sidelink carriers for transmissions (for example, a sl-txcc-list2) or one or more sidelink component carriers for reception (for example, a sl-rxcc-list2), where the one or more sidelink carriers for transmissions may be same or different from the one or more sidelink component carriers for reception.

In a third operation 815, the network node 110 may transmit, and the first UE 120 and the second UE 120 may receive, an indication that sidelink carrier aggregation (CA) is supported for the wireless network or by the network node 110. The indication that sidelink carrier aggregation is supported may be included in a sidelink common configuration. In some aspects, the network node 110 may transmit, and the first UE 120 and the second UE 120 may receive, system information indicating that sidelink carrier aggregation is supported. For example, the indication may be included in a system information block (SIB). The SIB may be associated with a sidelink common configuration. For example, the SIB may be SIB12 (for example, as defined, or otherwise fixed, by the 3GPP). For example, the first UE 120 and the second UE 120 may monitor for the SIB that is broadcast by the network node 110. The SIB may include an indication as to whether the network node 110 supports sidelink carrier aggregation. The indication as to whether the network node 110 supports sidelink carrier aggregation may be an explicit indication or an implicit indication. In some aspects, the network (for example, the network node 110) may explicitly indicate whether sidelink carrier aggregation is supported (for example, a flag for sidelink carrier aggregation is set with a value of "0" if carrier aggregation is not supported or set with a value of "1" if carrier aggregation is supported). In some aspects, the network (for example, the network node 110) may implicitly indicate whether sidelink carrier aggregation is supported (for example, if more than one component carriers are indicated for a sidelink communication, this may imply that carrier aggregation is supported).

In a fourth operation 820, the first UE 120 may transmit, and the network node 110 may receive, a first indication, associated with a sidelink communication, of at least one of whether sidelink carrier aggregation is supported or a first one or more component carriers associated with the sidelink communication. For example, the first indication may be based on the one or more indications obtained from the upper layer(s) of the first UE 120 in the first operation 805. In some aspects, the first indication may be associated with the L2 destination identifier. For example, the sidelink communication may be a broadcast communication or a groupcast communication associated with the L2 destination identifier. In some aspects, the first indication may be associated with, or based at least in part on, one or more sidelink service types. In some aspects, whether sidelink carrier aggregation is supported or the first one or more component carriers associated with the sidelink communication may be based at least in part on a capability of the first UE 120.

In some aspects, the first indication may be included in an uplink communication. For example, the uplink communication may be an RRC communication. In some aspects, the first indication may be included in a sidelink UE information communication. For example, the first UE 120 may transmit a sidelink UE information message to the network node 110 indicating support for sidelink carrier aggregation (SL CA) (for example, "SL-CA" or a bit indication sl-ca="1") when all indications from the upper layer indicate support for SL CA. The sidelink UE information message may indicate the associated sidelink component carrier lists (for example, the sl-rxcc-list1 for reception and the sl-txcc-list1 for transmission, where sl-rxcc-list1 may be same or different from sl-txcc-list1). Alternatively, the first UE 120 may transmit a sidelink UE information message to the network node 110 indicating not supporting sidelink carrier aggregation (for example, "No-SL-CA" or a bit indication sl-ca="0") when at least one indication from the upper layer indicates not supporting sidelink carrier aggregation or when no indication from the upper layer. The sidelink UE information message may indicate the associated sidelink component carrier (SL CC) lists (for example, the sl-rxcc-list1 for reception and the sl-txcc-list1 for transmission, where sl-rxcc-list1 may be same or different from sl-txcc-list1) for the L2 destination identifier associated with a groupcast or broadcast communication.

Similarly, in a fifth operation 825, the second UE 120 may transmit, and the network node 110 may receive, a first indication, associated with the sidelink communication, of at least one of whether sidelink carrier aggregation is supported or a first one or more component carriers associated with the sidelink communication. For example, the first indication may be based on the one or more indications obtained from the upper layer(s) of the second UE 120 in the second operation 810. In some aspects, the first indication may be associated with the L2 destination identifier. For example, the sidelink communication may be a broadcast communication or a groupcast communication associated with the L2 destination identifier. In some aspects, the first indication may be associated with, or based at least in part on, one or more sidelink service types.

In some aspects, the first indication may be included in an uplink communication. For example, the uplink communication may be an RRC communication. In some aspects, the first indication may be included in a sidelink UE information communication. For example, the second UE 120 may transmit a sidelink UE information message to the network node 110 indicating support for sidelink carrier aggregation (SL CA) (for example, "SL-CA" or a bit indication sl-ca="1") when all indications from the upper layer indicate support for SL CA. The sidelink UE information message may indicate the associated sidelink component carrier lists (for example, the sl-rxcc-list2 for reception and the sl-txcc-list2 for transmission, where sl-rxcc-list2 may be same or different from sl-txcc-list2). Alternatively, the second UE 120 may transmit a sidelink UE information message to the network node 110 indicating not supporting sidelink carrier aggregation (for example, "No-SL-CA" or a bit indication sl-ca="0") when at least one indication from the upper layer indicates not supporting sidelink carrier aggregation or when no indication from the upper layer. The sidelink UE information message may indicate the associated sidelink component carrier (SL CC) lists (for example, the sl-rxcc-list2 for reception and the sl-txcc-list2 for transmission, where sl-rxcc-list2 may be same or different from sl-txcc-list2) for the L2 destination identifier associated with a groupcast or broadcast communication.

The network node 110 may receive indications from other UEs in a similar manner. In some aspects, the UE(s) (for example, the first UE 120 and the second UE 120) may transmit sidelink UE information indicating information associated with supported component carriers for sidelink carrier aggregation based at least in part on the network node 110 transmitting the indication that sidelink carrier aggregation is supported by the network node 110 (for example, in the third operation 815). For example, the first UE 120 (for example, in the fourth operation 820) and the second UE 120 (for example, in the fifth operation 825) may transmit sidelink UE information indicating information associated with sidelink carrier aggregation (for example, supporting carrier aggregation and associated component carriers) based at least in part on the network node 110 transmitting a SIB indicating that sidelink carrier aggregation is supported (for example, in the third operation 815).

In some aspects, the UE(s) (for example, the first UE 120 and the second UE 120) may transmit sidelink buffer status report (SL-BSR) indicating information associated with supported component carriers for sidelink carrier aggregation based at least in part on the network node 110 transmitting the indication that sidelink carrier aggregation is supported by the network node 110 (for example, in the third operation 815). For example, the first UE 120 (for example, in the fourth operation 820) and the second UE 120 (for example, in the fifth operation 825) may transmit SL-BSR indicating information associated with sidelink carrier aggregation (for example, whether supporting carrier aggregation and associated component carriers) based at least in part on the network node 110 transmitting a SIB indicating that sidelink carrier aggregation is supported (for example, in the third operation 815).

In some aspects, the UE(s) (for example, the first UE 120 and the second UE 120) may transmit sidelink buffer status report (SL-BSR) indicating information associated with supported component carriers for sidelink carrier aggregation based at least in part on the one or more indications from upper layer for a sidelink communication. For example, the first UE 120 (for example, in the fourth operation 820) and the second UE 120 (for example, in the fifth operation 825) may transmit SL-BSR indicating information associated with sidelink carrier aggregation (for example, whether supporting carrier aggregation and associated component carriers) based at least in part on the one or more indications from upper layer for the sidelink communication associated with the data in the buffer (for example, logical channel(s) associated to an L2 destination identifier, for example, as indicated via destination index).

In a sixth operation 830, the network node 110 may determine a sidelink component carrier list and whether duplication is enabled for the sidelink communication (or for the L2 destination identifier). For example, the network node 110 may determine the sidelink component carrier list and whether duplication is enabled for the sidelink communication (or for the L2 destination identifier) based on indications received from one or more UEs, such as the indications transmitted as described above in connection with the fourth operation 820 and the fifth operation 825. In other words, the network node 110 may determine one or more sidelink component carrier lists with transmission duplication or not for the L2 destination ID associated with a groupcast or broadcast based on the sidelink UE information message(s) or sidelink buffer status report message(s) received by the network node 110.

For example, if all services or service types associated with the L2 destination ID identifier a groupcast or broadcast support sidelink carrier aggregation (for example, indicating "SL-CA" or a bit indication sl-ca="1" without UE capability limitation on sidelink CCs in indication(s) from an upper layer, as described above), then the network node 110 may determine the one or more sidelink component carrier lists for sidelink carrier aggregation transmissions associated with the L2 destination identifier without transmission duplication. As another example, if at one service or service type associated with the L2 destination identifier for a groupcast or broadcast does not support sidelink carrier aggregation (for example, indicating "No-SL-CA" or a bit indication sl-ca="0" in an indication from an upper layer, as described above) or if there are any UEs with UE capability limitation on sidelink component carriers, then the network node 110 may determine the one or more sidelink component carrier lists for sidelink carrier aggregation transmissions associated with the L2 destination identifier with transmission duplications on the sidelink component carriers derived from the one or more sidelink component carrier lists to ensure that UEs not supporting sidelink carrier aggregation or UEs with limited UE capability on sidelink component carriers may receive a sidelink communication packet. In other words, if the first indication transmitted by the first UE 120 or the second UE 120 (for example, in the fourth operation 820 or the fifth operation 825) includes an indication that sidelink carrier aggregation is not supported for one or more component carriers, then the network node 110 may determine that packets associated with the sidelink communication are to be duplicated on multiple component carriers associated to services or service types not supporting carrier aggregation.

For example, the network node 110 may receive indications of supported component carriers for various sidelink service types or various UEs. For example, the first UE 120 may indicate that a first set of component carriers are supported for the sidelink communication (for example, for an L2 destination identifier) based in part at least on capability associated with the first UE 120. Similarly, the second UE 120 may indicate that a second set of component carriers are supported for the sidelink communication (for example, for the L2 destination identifier) based in part at least on a capability associated with the second UE 120. Assuming that the network node 110 only receives the two indications for ease of explanation, the network node 110 may determine that the one or more sidelink component carrier lists for sidelink carrier aggregation transmissions associated with the L2 destination identifier without transmission duplication if the first set of component carriers and the second set of component carriers include at least one common component carrier. In such examples, the one or more sidelink component carrier lists may include the at least one common component carrier to ensure that packets associated with the sidelink communication can be received by all UEs (for example, the first UE 120 and the second UE 120).

Alternatively, the network node 110 may determine that the one or more sidelink component carrier lists for sidelink carrier aggregation transmissions associated with the L2 destination identifier with transmission duplication if the first set of component carriers and the second set of component carriers do not include at least one common component carrier (for example, if the first set of component carriers and the second set of component carriers are mutually exclusive). In such examples, packets associated with the sidelink communication may be duplicated on at least one component carrier from the first set of component carriers and on at least one component carrier from the second set of component carriers to ensure that packets associated with the sidelink communication can be received by all UEs (for example, the first UE 120 and the second UE 120).

In a seventh operation 835, the network node 110 may transmit, and the first UE 120 may receive, configuration information for sidelink carrier aggregation. In some aspects, the first UE 120 may receive the configuration information via one or more of RRC signaling, one or more MAC control elements (MAC-CEs), or DCI, among other examples. For example, the network node 110 may transmit a dedicated sidelink configuration message for the first UE 120 (for example, a sidelink RRC configuration). In some aspects, the configuration information may indicate that transmissions associated with the sidelink communication are to be duplicated for multiple component carriers. For example, the configuration information may indicate one or more sidelink component carriers lists that are configured for the first UE 120 (for example, a sl-rxcc-list3 and a sl-txcc-list3). The one or more sidelink component carriers lists (for example, the sl-rxcc-list3 and the sl-txcc-list3) may be based at least in part on the component carriers that were indicated as being supported by the first UE 120, such as in the fourth operation 820 (for example, the sl-rxcc-list1 and the sl-txcc-list1).

Additionally, the configuration information may indicate whether transmission duplication is enabled for the sidelink communication (for example, for the L2 destination identifier). For example, a radio resource control communication (for example, that includes the configuration information) may indicate multiple component carriers (for example, the sl-rxcc-list3 and the sl-txcc-list3) and may include an indication of a type of duplication to be associated with the multiple component carriers. The type of duplication may include MAC layer duplication (for example, as depicted and described in more detail in connection with FIG. 9) or PDCP layer duplication (for example, as depicted and described in more detail in connection with FIG. 10).

In an eighth operation 840, the network node 110 may transmit, and the second UE 120 may receive, configuration information for sidelink carrier aggregation. For example, the second UE 120 may receive configuration information for sidelink carrier aggregation in a similar manner as described above in connection with the seventh operation 835. For example, the network node 110 may transmit a dedicated sidelink configuration message for the second UE 120 (for example, a sidelink RRC configuration). In some aspects, the configuration information may indicate that transmissions associated with the sidelink communication is to be duplicated for multiple component carriers. For example, the configuration information may indicate one or more sidelink component carriers lists that are configured for the second UE 120 (for example, a sl-rxcc-list4 and a sl-txcc-list4). The one or more sidelink component carriers lists (for example, the sl-rxcc-list4 and the sl-txcc-list4) may be based at least in part on the component carriers that were indicated as being supported by the second UE 120, such as in the fifth operation 825 (for example, the sl-rxcc-list2 and the sl-txcc-list2).

Additionally, the configuration information may indicate whether transmission duplication is enabled for the sidelink communication (for example, for the L2 destination identifier). For example, a radio resource control communication (for example, that includes the configuration information) may indicate multiple component carriers (for example, the sl-rxcc-list4 and the sl-txcc-list4) and may include an indication of the type of duplication to be associated with the multiple component carriers.

In some aspects, the network node 110 may transmit, and the first or second UE 120 may receive, a MAC-CE communication activating or deactivating duplication or a type of duplication on multiple component carriers for sidelink carrier aggregation. For example, the network node 110 may transmit a MAC-CE to the first UE 120 or the second UE 120 activating duplications for transmissions associated with the sidelink communication for multiple component carriers. For example, the MAC-CE may activate one or more sidelink component carriers lists (for example, a sl-rxcc-list5 and a sl-txcc-list5) for duplication based at least in part on the component carriers that were indicated as being supported by the first or second UE 120, such as in the fourth operation 820 (for example, the sl-rxcc-list 1 and the sl-txcc-list1) or fifth operation 825 (for example, the sl-rxcc-list2 and the sl-txcc-list2). As another example, the MAC-CE may activate a type of duplication, such as MAC layer duplication (for example, as depicted and described in more detail in connection with FIG. 9) or PDCP layer duplication (for example, as depicted and described in more detail in connection with FIG. 10).

In a ninth operation 845, the first UE 120 may transmit, and the network node 110 may receive, a sidelink buffer status report. The sidelink buffer status report may include one or more channel busy ratio measurements associated with respective component carriers from the multiple component carriers configured for the first UE 120 (for example, from the sl-rxcc-list3 and the sl-txcc-list3). For example, the first UE 120 may perform the one or more channel busy ratio measurements. The first UE 120 may transmit the sidelink buffer status report that includes the indication of the one or more channel busy ratio measurements for component carriers that are configured for the first UE 120 for sidelink carrier aggregation (for example, from the sl-rxcc-list3 and the sl-txcc-list3).

Similarly, in a tenth operation 850, the second UE 120 may transmit, and the network node 110 may receive, a sidelink buffer status report. The sidelink buffer status report may include one or more channel busy ratio measurements associated with respective component carriers from the multiple component carriers configured for the second UE 120 (for example, from the sl-rxcc-list4 and the sl-txcc-list4). For example, the second UE 120 may perform the one or more channel busy ratio measurements. The second UE 120 may transmit the sidelink buffer status report that includes the indication of the one or more channel busy ratio measurements for component carriers that are configured for the second UE 120 for sidelink carrier aggregation (for example, from the sl-rxcc-list4 and the sl-txcc-list4). In this way, the network node 110 may receive indications of various channel busy ratio measurements for component carriers that are configured for sidelink carrier aggregation associated with a given sidelink communication.

This may enable the network node 110 to make improved determinations associated with which component carrier(s) is/are to be used for a transmission of the given sidelink communication. For example, the network node 110 may determine one or more component carriers on which a transmission of the sidelink communication is to be transmitted based at least in part on channel busy ratio measurements received by the network node 110. For example, the network node 110 may select one or more component carriers from the sl-rxcc-list3, the sl-txcc-list3, the sl-rxcc-list4, or the sl-txcc-list4, among other examples, based on the channel busy ratio measurements received by the network node 110. As another example, the network node 110 may determine multiple component carriers on which duplications of a transmission of the sidelink communication are to be transmitted based at least in part on channel busy ratio measurements received by the network node 110. For example, the network node 110 may select multiple component carriers from the sl-rxcc-list3, the sl-txcc-list3, the sl-rxcc-list4, or the sl-txcc-list4, among other examples, based on the channel busy ratio measurements received by the network node 110.

In an eleventh operation 855, the network node 110 may transmit, and the first UE 120 may receive, DCI indicating one or more component carriers for a transmission of the sidelink communication. For example, the DCI may indicate multiple component carriers and that a packet (for example, a transport block) is to be duplicated on each of the multiple component carriers (for example, on a plurality of component carriers). In some aspects, the DCI may include a bitmap (for example, a sl-cc-bitmap). The bitmap may include a respective bit associated with each of the multiple component carriers that are configured for the first UE 120 for sidelink carrier aggregation (for example, a respective bit for each component carrier included in the sl-rxcc-list3 or the sl-txcc-list3). For example, if seven component carriers are configured for the first UE 120 for sidelink carrier aggregation, then the bitmap may include seven bits.

For example, a value associated with a bit (for example, "0" or "1") may indicate whether the first UE 120 is to use a component carrier associated with the bit for a transmission of the packet associated with the sidelink communication and the L2 destination identifier. For example, a value of "0" may indicate that the first UE 120 is not to use the component carrier for the transmission and a value of "1" may indicate that the first UE 120 is to use the component carrier for the transmission. A mapping of bits to component carriers may be indicated in the configuration information (for example, received by the first UE 120 in the seventh operation 835). For example, the bitmap may include four bits corresponding to {CC1, CC2, CC3, CC4}. If the bitmap included in the DCI indicates values of {0,1,0,1}, then the first UE 120 may identify that the CC2 and the CC4 are to be used for the transmission (for example, the packet is to be duplicated on each of the CC2 and the CC4) and that the CC1 and the CC3 are not to be used for the transmission. The network node 110 may transmit scheduling information (for example, the DCI) to schedule a transport block transmission on the sidelink with transmission duplications as indicated by the bitmap. As described elsewhere herein, the network node 110 (or another network node) may select the component carriers to be associated with the transmission duplications based at least in part on the channel busy ratio measurements received by the network node 110. For example, with a component carrier list of {CC1, CC2, CC3, CC4} if transmission duplication may be conducted on either CC1 and CC3 or CC1 and CC4, CC1 and CC3 may be selected if the CBR measurements on CC3 is lower than the CBR measurement on CC4.

In a twelfth operation 860, the first UE 120 may transmit the sidelink communication via each of a plurality of component carriers as indicated in the DCI. In some aspects, the plurality of component carriers may include at least one component carrier from the one or more component carriers supported by the first UE 120 for sidelink carrier aggregation (for example, from the sl-rxcc-list 1 or the sl-txcc-list1 or the sl-rxcc-list3 or the sl-txcc-list3). For example, the sidelink communication may be associated with a transport block at MAC layer or a PDCP packet at PDCP layer. In the twelfth operation 860, the first UE 120 may transmit the transport block at MAC layer or the PDCP packet at PDCP layer on each of the plurality of component carriers (for example, on each component carrier indicated by the bitmap included in the DCI). In some aspects, the duplicated transmissions of the sidelink transmission may be based at least in part on duplicated MAC PDUs. The duplicated MAC PDUs may be associated with the plurality of component carriers, which may be associated with the L2 destination identifier. The duplication indication associated with the duplicated transmissions may be included in a MAC header or subheader of the duplicated transmissions. MAC layer duplication is described below in more detail in connection with FIG. 9. In some aspects, the duplicated transmissions of the sidelink transmission may be based at least in part on duplicated PDCP packets. The duplicated PDCP packets may be for a plurality of logical channels mapped with the plurality of component carriers associated with the L2 destination identifier. The duplication indication associated with the duplicated transmissions may be included in a PDCP header of the duplicated transmissions. PDCP layer duplication is described below in more detail in connection with FIG. 10.

Figure 9:
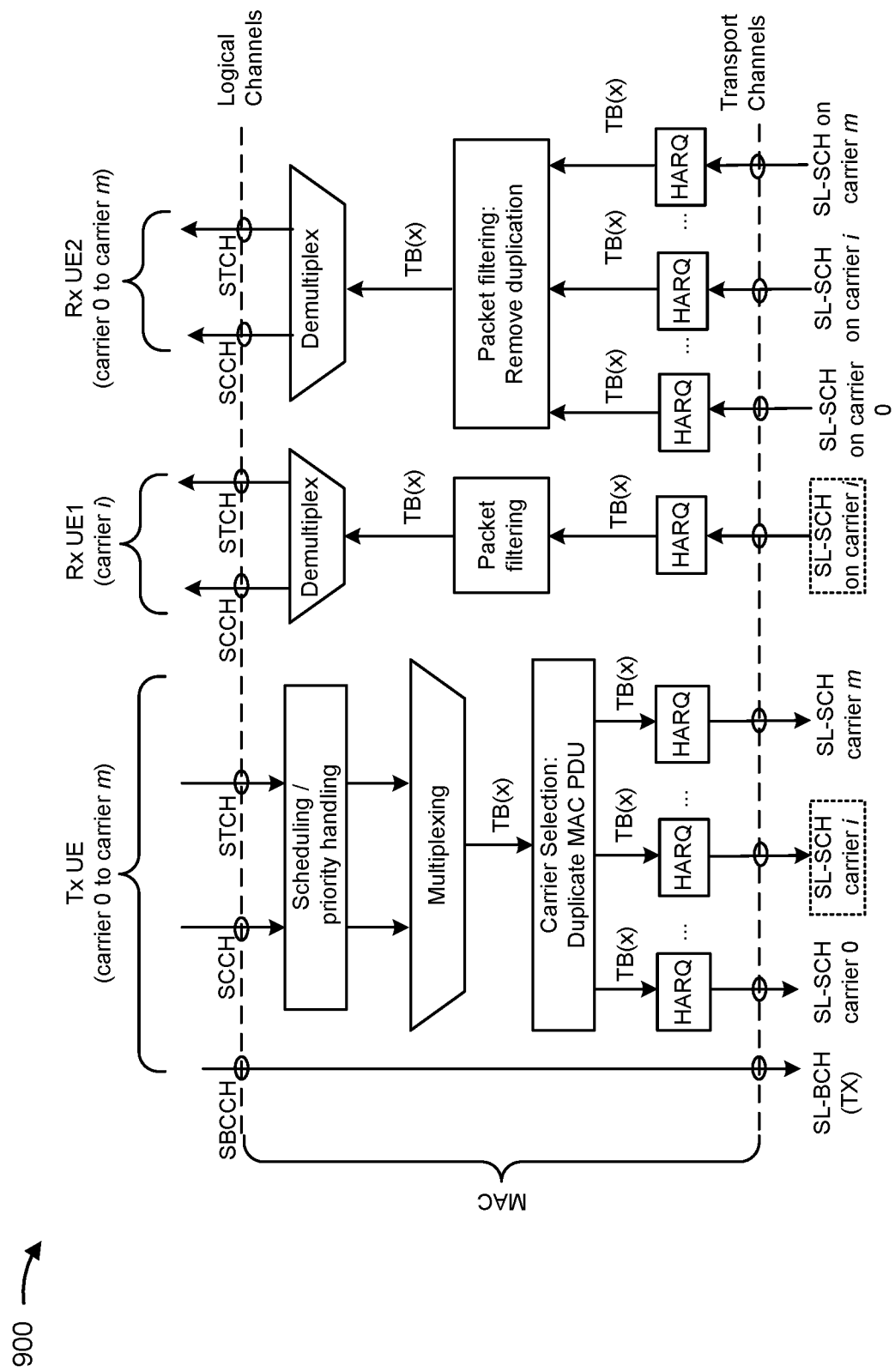
FIG. 9 is a diagram illustrating an example associated with duplicating sidelink transmissions for sidelink carrier aggregation, in accordance with the present disclosure.

FIG. 9 is a diagram illustrating an example associated with duplicating sidelink transmissions for sidelink carrier aggregation 900, in accordance with the present disclosure. In some aspects, a sidelink transmission may be duplicated with MAC PDUs on a plurality of carriers (for example, some or all carriers) associated with an L2 destination identifier of a groupcast or broadcast, when at least one indication from an upper layer indicates not supporting sidelink carrier aggregation. A first UE (for example, a Tx UE) supporting sidelink carrier aggregation may select a plurality of carriers (for example, some or all of carrier 0 to carrier m) associated with the L2 destination identifier of the groupcast or the broadcast, and duplicate a transport block (for example, TB(x)) on the plurality of carriers. The first UE may insert a duplication indication in a MAC header or subheader (for example, MACduplicate=1). The duplicated transport block on the plurality of carriers may correspond to a duplicated sidelink transmission. A second UE (for example, a first Rx UE) not supporting sidelink carrier aggregation may receive the transport block (for example, TB(x)) on a carrier (for example, carrier i) associated with the second UE. A third UE (for example, a second Rx UE) supporting sidelink carrier aggregation may receive the transport block (for example, TB(x)) on the plurality of carriers (for example, carrier 0 to carrier m), and the third UE may determine to perform a duplication removal based at least in part on the duplication indication (for example, MACduplicate=1).

As shown in FIG. 9, at the first UE (for example, the Tx UE, which may be associated with carrier 0 to carrier m), a MAC layer may involve a scheduling and priority handling, multiplexing, carrier selection, and HARQ processing. The multiplexing may result in a transport block (for example, TB(x)), which may be duplicated with MAC PDUs or sub-PDUs, which may result in duplicated transport blocks (for example, duplicated TB(x) with HARQ entities associated with the plurality of carriers (for example, some or all of carrier 0 to carrier m) for duplication). For example, the duplicated transport blocks may include a first transport block associated with a sidelink shared channel (SL-SCH) on carrier 0, a second transport block associated with an SL-SCH on carrier i, and a third transport block associated with an SL-SCH on carrier m. The second UE (for example, the first Rx UE, which may be associated with carrier i) not supporting sidelink carrier aggregation may receive the transport block on a single carrier (for example, carrier i) associated with the second UE. The third UE (for example, the second Rx UE, which may be associated with carrier 0 to carrier m) supporting sidelink carrier aggregation may receive the transport blocks on a plurality of carriers (for example, some or all of carrier 0 to carrier m). The third UE may determine to remove duplicated transport blocks based at least in part on a duplication indication inserted in a MAC header of the duplicated transport blocks, thereby resulting in a single transport block for which a demultiplexing is applied.

In some aspects, the third UE may determine transmission duplication based at least in part on the duplication indication in a MAC header or subheader, the logical channel identifier (LCD), and the pair of source and destination identifiers of the duplicated MAC PDUs or MAC sub-PDUs received from a plurality of carriers. A MAC entity may receive from a first component carrier a first MAC PDU or sub-PDU containing a duplication indication in the MAC header or subheader and a first logical channel identifier and first pair of source and destination identifiers, and may receive from a second component carrier a second MAC PDU or sub-PDU containing a duplication indication in the MAC header or subheader and a second logical channel identifier and second pair of source and destination identifiers. For example, if the MAC entity successfully decodes the first MAC PDU or sub-PDU and if the first logical channel identifier is the same as the second logical identifier (for example, the same logical channel instance of the corresponding MAC SDU or the type of the corresponding MAC CE within the scope of the pair of source and destination identifiers) and if the first pair of source and destination identifiers is the same as the second pair of source and destination identifiers (for example, transmitted from the same UE (source identifier) for the same sidelink communication (destination identifier)), the MAC entity may deliver the MAC SDU extracted from the first MAC PDU or sub-PDU to an upper layer (for example, RLC layer) and discard the second MAC PDU or sub-PDU (for example, the HARQ entity associated with the first or second MAC PDU or sub-PDU on the first or second component carrier may flush the buffer) and transmit an ACK or may not transmit any NACK on the first component carrier and/or the second component carrier. For example, if the MAC entity decodes unsuccessfully the first MAC PDU or sub-PDU and decodes successfully the second MAC PDU or sub-PDU and if the first logical channel identifier is the same as the second logical identifier and if the first pair of source and destination identifiers is the same as the second pair of source and destination identifiers for the same sidelink communication (destination identifier), the MAC entity may deliver the MAC SDU extracted from the second MAC PDU or sub-PDU to upper layer (for example, RLC layer) and discard the first MAC PDU or sub-PDU (for example, the HARQ entity associated with the first or second MAC PDU or sub-PDU on the first or second component carrier may flush the buffer) and transmit an ACK or may not transmit any NACK on the first component carrier and/or the second component carrier (for example, if HARQ feedback is enabled). As another example, if the MAC entity decodes unsuccessfully both the first MAC PDU or sub-PDU and the second MAC PDU or sub-PDU and if the first logical channel identifier is the same as the second logical identifier and if the first pair of source and destination identifiers is the same as the second pair of source and destination identifiers for the same sidelink communication (destination identifier), the MAC entity may transmit a NACK on either the first or the second component carrier (for example, if HARQ feedback is enabled) and/or an ACK on the other component carrier (for example, the HARQ entity associated with the other component carrier may flush the buffer), where the first or the second component carrier may be randomly selected or may be selected based at least in part on the measurements associated with the first and second MAC PDU or sub-PDU (for example, based at least in part on the RSRP or signal-to-interference-plus-noise ratio (SINK) measurement of the PSSCH carrying the first or second MAC PDU or sub-PDU).

In some aspects, the first UE may determine the retransmissions (for example, if HARQ feedback is enabled) on one or more component carriers based at least in part on the ACK or no NACK received. For example, the MAC entity may determine no retransmission (for example, the HARQ entities associated with the duplicated transmissions on multiple component carriers may flash the buffer and indicate a success (for example, an ACK) to upper layer if one or more ACK received from all RX UEs (for example, each Rx UE of a group responds with an ACK/NACK for HARQ feedback) or no NACK received (for example, an Rx UE responds only NACK for HARQ feedback) for the duplicated transmissions. For example, the MAC entity may determine one or more retransmissions via the HARQ entities associated with the component carriers with one or more NACKs received while the other HARQ entities associated with the component carriers with one or more ACKs or no NACKs received may flush the buffer with the duplicated TBs. The MAC entity may indicate a success (for example, an ACK) to upper layer (for example, RLC layer) after one or more ACK or no NACK received on the component carriers for all retransmissions or may indicate a failure (for example, a NACK) to upper layer after being timed out or reaching the maximum retransmissions allowed (for example, as configured) for the retransmission on any component carrier corresponding to duplicated transmissions.

Figure 10:
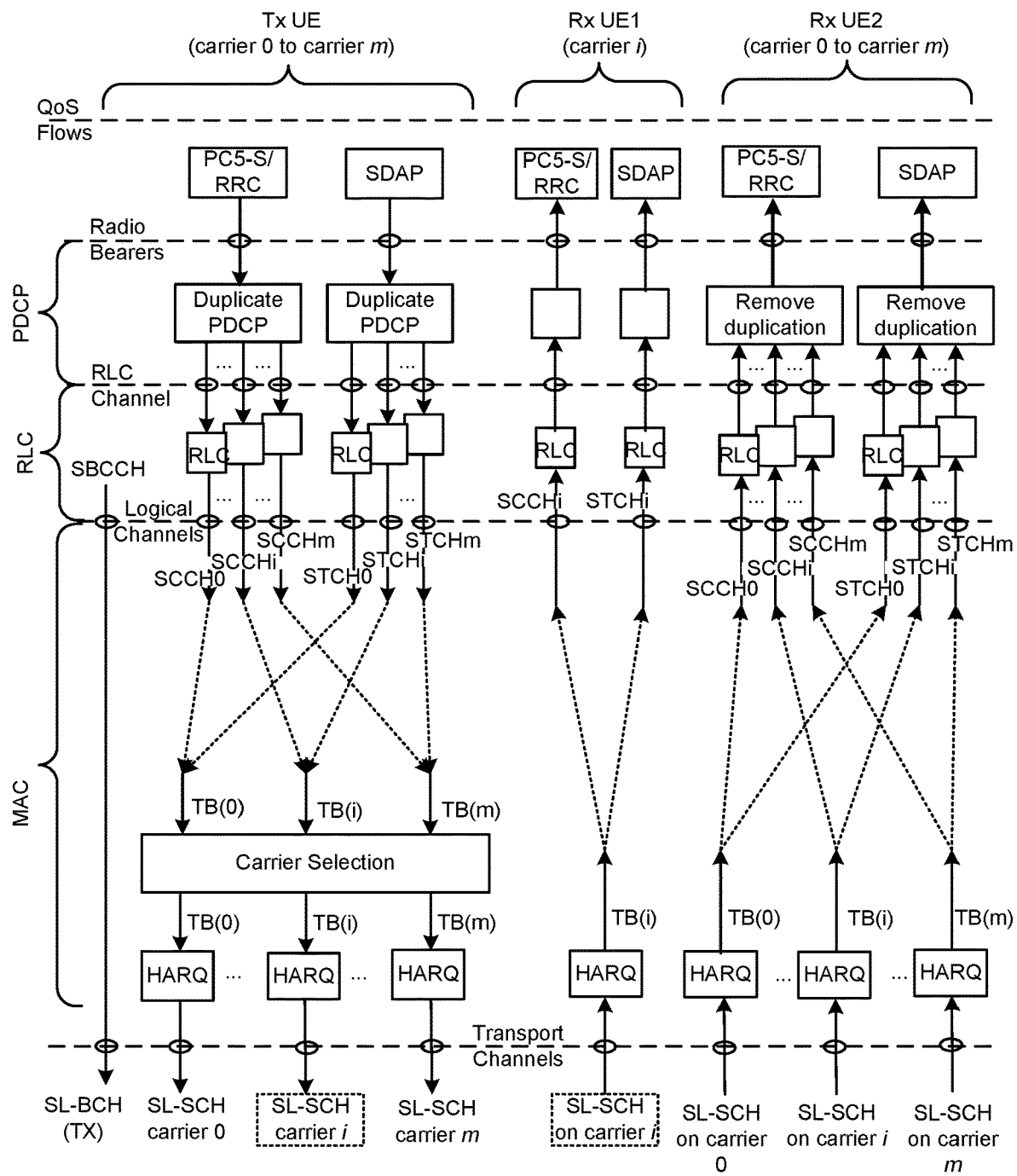
FIG. 10 is a diagram illustrating an example associated with duplicating sidelink transmissions for sidelink carrier aggregation, in accordance with the present disclosure.

FIG. 10 is a diagram illustrating an example 1000 associated with duplicating sidelink transmissions for sidelink carrier aggregation, in accordance with the present disclosure. In some aspects, a sidelink transmission may be duplicated at a PDCP layer via duplicated RLC entities with duplicated logical channels mapped to a plurality of carriers (for example, some or all of carrier 0 to carrier m), based at least in part on a cast type and at least one indication from an upper layer indicating not supporting sidelink carrier aggregation.

A first UE (for example, a Tx UE) supporting sidelink carrier aggregation may duplicate a PDCP packet on duplicated logical channels mapped with some or all carriers (for example, sidelink control channel (SCCH) 0 to SCCH m, or sidelink traffic channel (STCH) 0 to STCH m), and the first UE may insert a duplication indication in a PDCP header (for example, PDCPduplicate=1 or PDCP sequence number (SN) without "0" value). The duplicated PDCP packet on duplicated logical channels mapped with the plurality of carriers may correspond to a duplicated sidelink transmission. A second UE (for example, a first Rx UE) not supporting sidelink carrier aggregation may receive the PDCP packet on a logical channel mapped with its carrier (for example, carrier i). A third UE (for example, a second Rx UE) supporting sidelink carrier aggregation may receive PDCP packets on duplicated logical channels mapped with the plurality of carriers (for example, some or all of carrier 0 to carrier m), and the third UE may determine to perform a duplication removal based at least in part on the duplication indication (for example, PDCPduplicate=1 or PDCP SN).

As shown in FIG. 10, at the first UE (for example, the Tx UE, which may be associated with carrier 0 to carrier m), the PDCP layer may duplicate a PDCP packet. The PDCP packet duplication may be based at least in part on a QoS flow, which may be associated with a PC5 sidelink (PC5-S) or RRC layer or an SDAP layer. Duplicated PDCP packets may further undergo a scheduling or priority handling, multiplexing, carrier selection, and HARQ processing. The duplicated PDCP packets may result in multiple transport blocks (for example, TB (0), . . . , TB(i), . . . , TB(m) as shown), which may correspond to a plurality of carriers (for example, some or all of carrier 0 to carrier m). The second UE (for example, the first Rx UE, which may be associated with carrier i) not supporting sidelink carrier aggregation may receive a PDCP packet on a logical channel mapped to a single carrier (for example, carrier i) associated with the second UE, where the PDCP packet may be derived from a received transport block (for example, TB(i)). The third UE (for example, the second Rx UE, which may be associated with carrier 0 to carrier m) supporting sidelink carrier aggregation may receive PDCP packets on duplicated logical channels mapped with the plurality of carriers (for example, some or all of carrier 0 to carrier m), where the PDCP packets may be derived from received transport blocks (for example, TB (0) to TB(m)). The received transport blocks may be subjected to a HARQ processing, a packet filtering, and a demultiplexing before the PDCP packets are obtained. The third UE may determine to remove duplicated PDCP packets based at least in part on a duplication indication inserted in a PDCP header of the duplicated PDCP packets (for example, PDCPduplicate=1 or PDCP SN), thereby resulting in a single PDCP packet.

In some aspects, the third UE may determine transmission duplication based at least in part on the duplication indication in a PDCP header of the duplicated PDCP PDU. A PDCP entity may receive a first PDCP PDU from a first duplicated logical channel via a first duplicated RLC entity and may receive a second PDCP PDU from a second duplicated logical channel via a second duplicated RLC entity. For example, if the PDCP entity successfully received the first PDCP PDU with the indication of duplication, the PDCP entity may deliver the PDCP SDU extracted from the first PDCP PDU to upper layer (for example, PC5-S or RRC for control plane or SDAP for user plane), discard the second PDCP PDU, and, for an acknowledged mode (AM) DRB, transmit a PDCP status report to the first UE setting in the bitmap field as "1" for the first and/or the second PDCP SDU. For example, if the PDCP entity unsuccessfully received the first PDCP PDU and received successfully the second PDCP PDU, the PDCP entity may deliver the PDCP SDU extracted from the second PDCP PDU to an upper layer, discard the first PDCP PDU, and, for an AM DRB, transmit a PDCP status report to the first UE setting in the bitmap field as '1' for the first and/or the second PDCP SDU. As another example, if the PDCP entity unsuccessfully received both the first PDCP PDU and the second PDCP PDU, the PDCP entity may not deliver any PDCP SDU to an upper layer and, for an AM DRB, may transmit a PDCP status report to the first UE setting in the bitmap field as '0' respectively for the first and/or the second PDCP SDU.

In some aspects, for AM DRBs configured by an upper layer, the first UE may determine the retransmissions on one or more component carriers based at least in part on the PDCP status report(s) received. For example, the PDCP entity may determine the duplication for a retransmission based at least in part on PDCP status reports received from Rx UEs, where each PDCP status report contains bitmap "0" or "1" for a PDCP SDU corresponding to duplicated transmissions. For example, the PDCP entity may determine a duplication for retransmissions on a first duplicated logical channel and a second duplicated logical channel corresponding to a first component carrier and a second component carrier (for example, logical channel i and logical channel j mapped to component carrier i and component carrier j respectively) if bitmap "0" for a first PDCP SDU associated with the first duplicated logical channel mapped to the first component carrier and/or if bitmap "0" for a second PDCP SDU associated with the second duplicated logical channel mapped to the second component carrier (for example, logical channel i and logical channel j mapped to component carrier i and component carrier j respectively).

Figure 11:
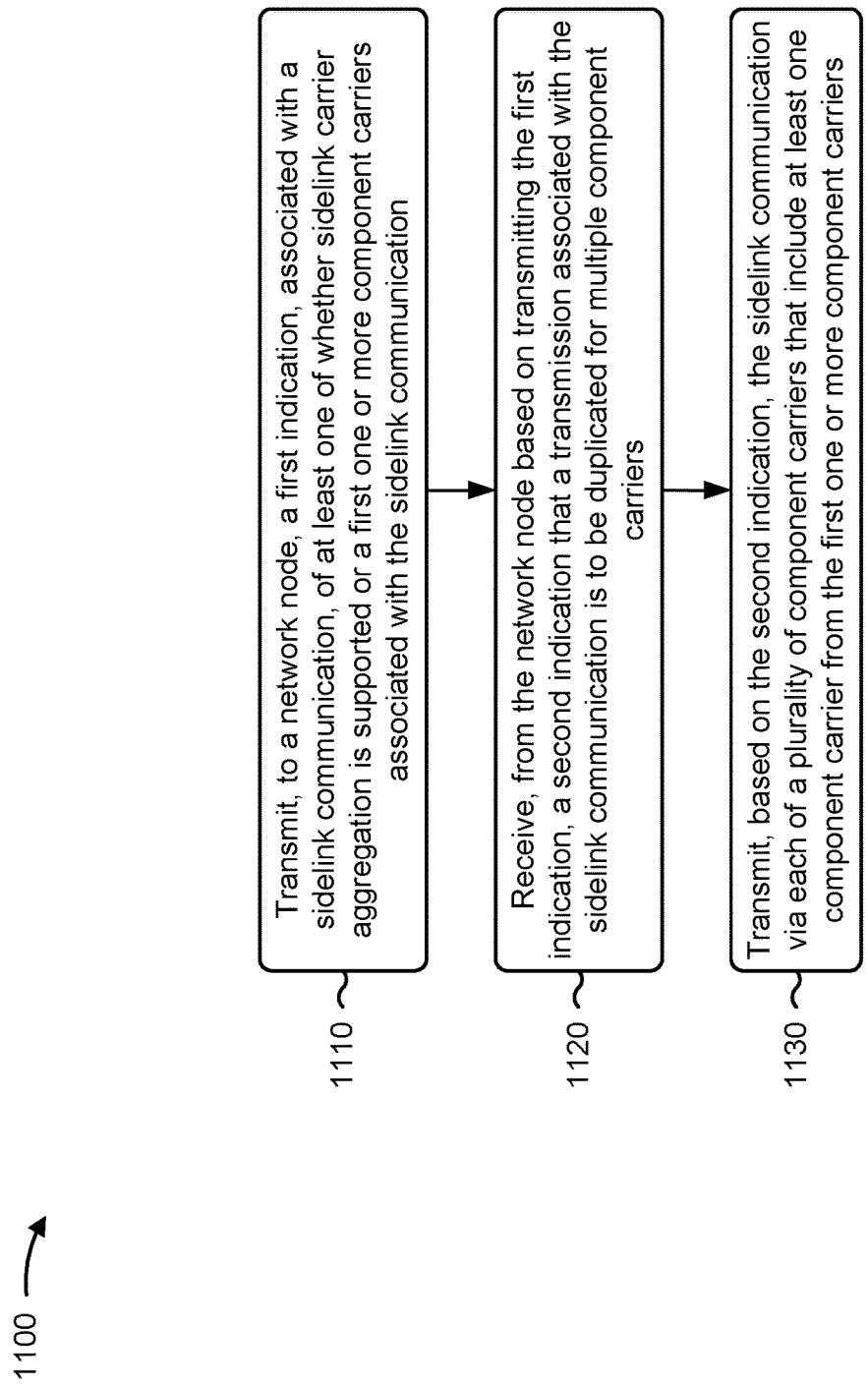
FIG. 11 is a flowchart illustrating an example process performed, for example, by a UE, associated with sidelink carrier aggregation, in accordance with the present disclosure.

FIG. 11 is a flowchart illustrating an example process 1100 performed, for example, by a UE, associated with sidelink carrier aggregation, in accordance with the present disclosure. Example process 1100 is an example where the UE (for example, the UE 120) performs operations associated with sidelink carrier aggregation.

As shown in FIG. 11, in some aspects, process 1100 may include transmitting, to a network node, a first indication, associated with a sidelink communication, of at least one of whether sidelink carrier aggregation is supported or a first one or more component carriers associated with the sidelink communication (block 1110). For example, the UE (such as by using communication manager 140 or transmission component 1304, depicted in FIG. 13) may transmit, to a network node, a first indication, associated with a sidelink communication, of at least one of whether sidelink carrier aggregation is supported or a first one or more component carriers associated with the sidelink communication, as described above.

As further shown in FIG. 11, in some aspects, process 1100 may include receiving, from the network node based on transmitting the first indication, a second indication that a transmission associated with the sidelink communication is to be duplicated for multiple component carriers (block 1120). For example, the UE (such as by using communication manager 140 or reception component 1302, depicted in FIG. 13) may receive, from the network node based on transmitting the first indication, a second indication that a transmission associated with the sidelink communication is to be duplicated for multiple component carriers, as described above.

As further shown in FIG. 11, in some aspects, process 1100 may include transmitting, based on the second indication, the sidelink communication via each of a plurality of component carriers that include at least one component carrier from the first one or more component carriers (block 1130). For example, the UE (such as by using communication manager 140 or transmission component 1304, depicted in FIG. 13) may transmit, based on the second indication, the sidelink communication via each of a plurality of component carriers that include at least one component carrier from the first one or more component carriers, as described above.

Process 1100 may include additional aspects, such as any single aspect or any combination of aspects described below or in connection with one or more other processes described elsewhere herein.

In a first additional aspect, process 1100 includes obtaining, from an upper layer associated with the UE, information indicating at least one of whether sidelink carrier aggregation is supported or the first one or more component carriers, where the first one or more component carriers are associated with one or more sidelink service types.

In a second additional aspect, alone or in combination with the first aspect, the sidelink communication is a broadcast communication or a groupcast communication associated with a Layer 2 destination identifier.

In a third additional aspect, alone or in combination with one or more of the first and second aspects, the first indication is included in a sidelink UE information communication.

In a fourth additional aspect, alone or in combination with one or more of the first through third aspects, whether sidelink carrier aggregation is supported or the first one or more component carriers associated with the sidelink communication is based at least in part on a capability of the UE.

In a fifth additional aspect, alone or in combination with one or more of the first through fourth aspects, the first indication includes an indication that sidelink carrier aggregation is not supported for a second one or more component carriers, and receiving the second indication is based at least in part on sidelink carrier aggregation not being supported for the second one or more component carriers.

In a sixth additional aspect, alone or in combination with one or more of the first through fifth aspects, the first indication is based at least in part on respective indications for a plurality of sidelink service types and respective component carriers associated with the plurality of sidelink service types.

In a seventh additional aspect, alone or in combination with one or more of the first through sixth aspects, process 1100 includes receiving, from the network node, system information indicating that sidelink carrier aggregation is supported, where transmitting the first indication is based at least in part on receiving the system information.

In an eighth additional aspect, alone or in combination with one or more of the first through seventh aspects, the second indication is included in a radio resource control communication.

In a ninth additional aspect, alone or in combination with one or more of the first through eighth aspects, the radio resource control communication indicates the multiple component carriers and includes an indication of a type of duplication to be associated with the multiple component carriers.

In a tenth additional aspect, alone or in combination with one or more of the first through ninth aspects, the type of duplication includes MAC layer duplication or PDCP layer duplication.

In an eleventh additional aspect, alone or in combination with one or more of the first through tenth aspects, process 1100 includes transmitting, to the network node, a sidelink buffer status report, where the sidelink buffer status report includes one or more channel busy ratio measurements associated with respective component carriers from the multiple component carriers.

In a twelfth additional aspect, alone or in combination with one or more of the first through eleventh aspects, the second indication is included in a DCI communication that schedules the sidelink communication.

In a thirteenth additional aspect, alone or in combination with one or more of the first through twelfth aspects, the DCI communication includes an indication of the plurality of component carriers.

In a fourteenth additional aspect, alone or in combination with one or more of the first through thirteenth aspects, the indication of the plurality of component carriers includes a bitmap, and the bitmap includes a respective bit associated with each of the multiple component carriers.

In a fifteenth additional aspect, alone or in combination with one or more of the first through fourteenth aspects, the sidelink communication is associated with a transport block or a PDCP packet, and transmitting the sidelink communication includes transmitting the transport block or the PDCP packet on each of the plurality of component carriers.

Although FIG. 11 shows example blocks of process 1100, in some aspects, process 1100 may include additional blocks, fewer blocks, different blocks, or differently arranged blocks than those depicted in FIG. 11. Additionally or alternatively, two or more of the blocks of process 1100 may be performed in parallel.

Figure 12:
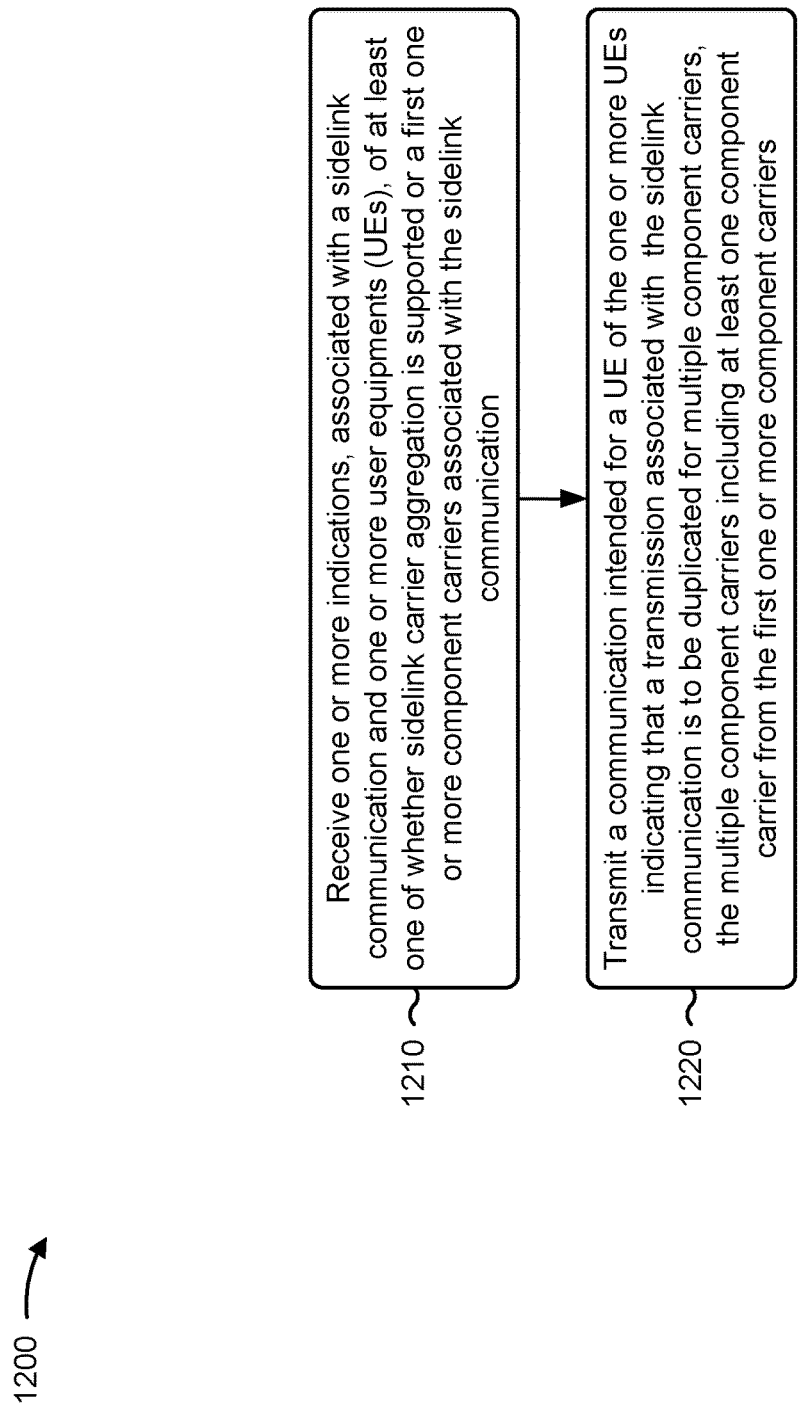
FIG. 12 is a flowchart illustrating an example process performed, for example, by a network node, associated with sidelink carrier aggregation, in accordance with the present disclosure.

FIG. 12 is a flowchart illustrating an example process 1200 performed, for example, by a network node, associated with sidelink carrier aggregation, in accordance with the present disclosure. Example process 1200 is an example where the network node (for example, the network node 110) performs operations associated with sidelink carrier aggregation.

As shown in FIG. 12, in some aspects, process 1200 may include receiving one or more indications, associated with a sidelink communication and one or more UEs, of at least one of whether sidelink carrier aggregation is supported or a first one or more component carriers associated with the sidelink communication (block 1210). For example, the network node (such as by using communication manager 150 or reception component 1402, depicted in FIG. 14) may receive one or more indications, associated with a sidelink communication and one or more UEs, of at least one of whether sidelink carrier aggregation is supported or a first one or more component carriers associated with the sidelink communication, as described above.

As further shown in FIG. 12, in some aspects, process 1200 may include transmitting a communication intended for a UE of the one or more UEs indicating that a transmission associated with the sidelink communication is to be duplicated for multiple component carriers, the multiple component carriers including at least one component carrier from the first one or more component carriers (block 1220). For example, the network node (such as by using communication manager 150 or transmission component 1404, depicted in FIG. 14) may transmit a communication intended for a UE of the one or more UEs indicating that a transmission associated with the sidelink communication is to be duplicated for multiple component carriers, the multiple component carriers including at least one component carrier from the first one or more component carriers, as described above.

Process 1200 may include additional aspects, such as any single aspect or any combination of aspects described below or in connection with one or more other processes described elsewhere herein.

In a first additional aspect, the sidelink communication is a broadcast communication or a groupcast communication associated with a Layer 2 destination identifier.

In a second additional aspect, alone or in combination with the first aspect, the indications are included in sidelink UE information communications.

In a third additional aspect, alone or in combination with one or more of the first and second aspects, the indication is based at least in part on a capability of the one or more UEs.

In a fourth additional aspect, alone or in combination with one or more of the first through third aspects, the indication includes an indication that sidelink carrier aggregation is not supported for a third one or more component carriers, and transmitting the communication indicating that transmissions associated with the sidelink communication are to be duplicated for the multiple component carriers is based at least in part on sidelink carrier aggregation not being supported for the third one or more component carriers.

In a fifth additional aspect, alone or in combination with one or more of the first through fourth aspects, process 1200 includes transmitting system information indicating that sidelink carrier aggregation is supported, where receiving the indications is based at least in part on transmitting the system information.

In a sixth additional aspect, alone or in combination with one or more of the first through fifth aspects, the communication is included in a radio resource control communication.

In a seventh additional aspect, alone or in combination with one or more of the first through sixth aspects, the radio resource control communication indicates the multiple component carriers and an indication of a type of duplication to be associated with the multiple component carriers.

In an eighth additional aspect, alone or in combination with one or more of the first through seventh aspects, the type of duplication includes MAC layer duplication or PDCP layer duplication.

In a ninth additional aspect, alone or in combination with one or more of the first through eighth aspects, process 1200 includes receiving a sidelink buffer status report, the sidelink buffer status report includes one or more channel busy ratio measurements associated with respective component carriers from the multiple component carriers, and transmitting DCI communication scheduling the sidelink communication to be transmitted via a second one or more component carriers from the multiple component carriers, where the second one or more component carriers are selected based at least in part on the one or more channel busy ratio measurements.

In a tenth additional aspect, alone or in combination with one or more of the first through ninth aspects, the communication is included in a DCI communication that schedules the sidelink communication.

In an eleventh additional aspect, alone or in combination with one or more of the first through tenth aspects, the DCI communication includes an indication of a second one or more component carriers from the multiple component carriers.

In a twelfth additional aspect, alone or in combination with one or more of the first through eleventh aspects, the indication includes a bitmap, and the bitmap includes a respective bit associated with each of the multiple component carriers.

In a thirteenth additional aspect, alone or in combination with one or more of the first through twelfth aspects, receiving the indications includes receiving a first indication of the first one or more component carriers, and receiving a second indication of a second one or more component carriers that are supported for the sidelink communication by another UE of the one or more UEs, and transmitting the communication is based at least in part on the first one or more component carriers and the second one or more component carriers being mutually exclusive.

Although FIG. 12 shows example blocks of process 1200, in some aspects, process 1200 may include additional blocks, fewer blocks, different blocks, or differently arranged blocks than those depicted in FIG. 12. Additionally or alternatively, two or more of the blocks of process 1200 may be performed in parallel.

Figure 13:
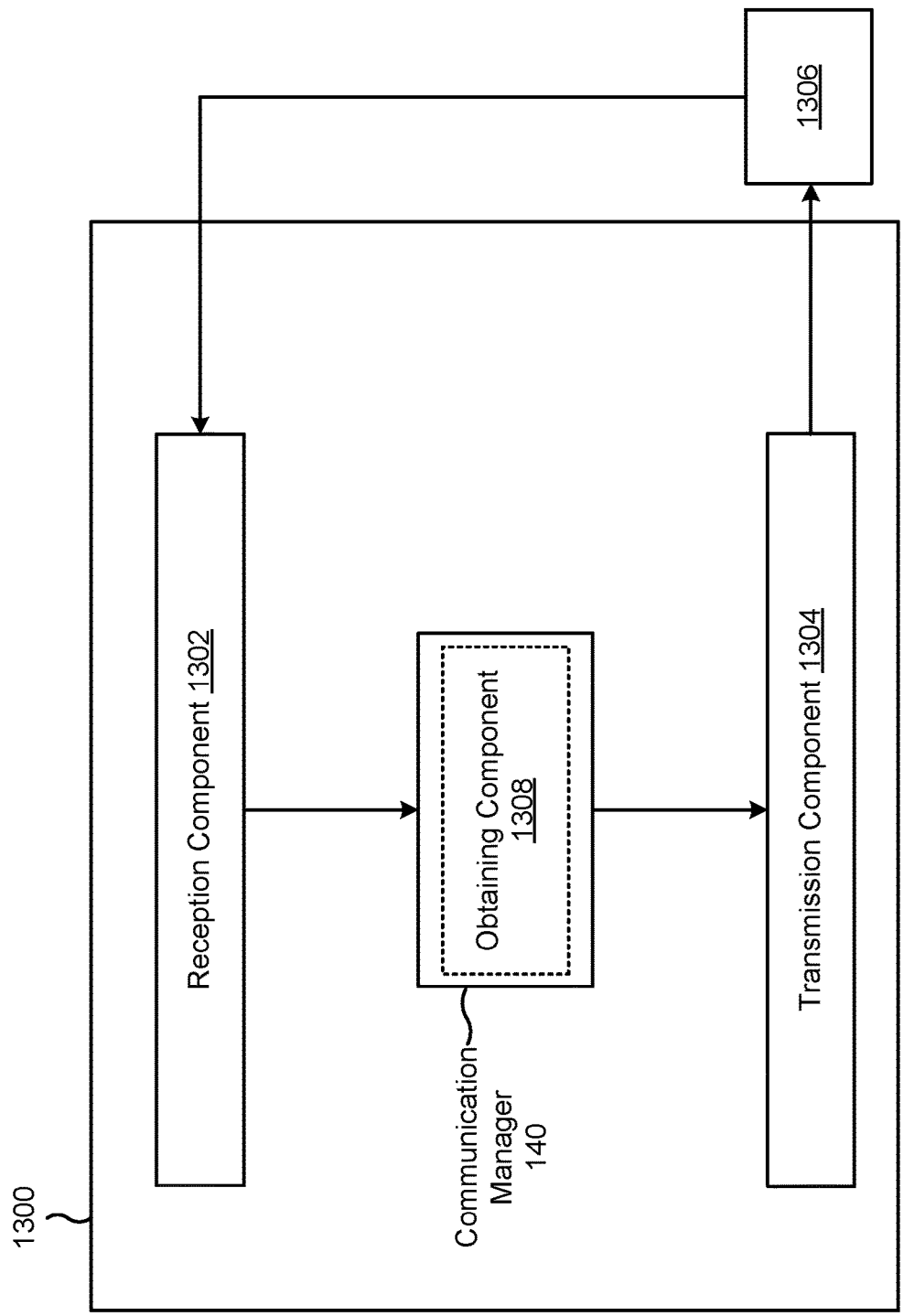
FIG. 13 is a diagram of an example apparatus for wireless communication in accordance with the present disclosure.

FIG. 13 is a diagram of an example apparatus 1300 for wireless communication in accordance with the present disclosure. The apparatus 1300 may be a UE, or a UE may include the apparatus 1300. In some aspects, the apparatus 1300 includes a reception component 1302, a transmission component 1304, and a communication manager 140, which may be in communication with one another (for example, via one or more buses). As shown, the apparatus 1300 may communicate with another apparatus 1306 (such as a UE, a network node, or another wireless communication device) using the reception component 1302 and the transmission component 1304.

In some aspects, the apparatus 1300 may be configured to perform one or more operations described herein in connection with FIGS. 8-10. Additionally or alternatively, the apparatus 1300 may be configured to perform one or more processes described herein, such as process 1100 of FIG. 11, or a combination thereof. In some aspects, the apparatus 1300 may include one or more components of the UE described above in connection with FIG. 2.

The reception component 1302 may receive communications, such as reference signals, control information, data communications, or a combination thereof, from the apparatus 1306. The reception component 1302 may provide received communications to one or more other components of the apparatus 1300, such as the communication manager 140. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1302 may include one or more antennas, a modem, a demodulator, a MIMO detector, a receive processor, a controller/processor, a memory, or a combination thereof, of the UE described above in connection with FIG. 2.

The transmission component 1304 may transmit communications, such as reference signals, control information, data communications, or a combination thereof, to the apparatus 1306. In some aspects, the communication manager 140 may generate communications and may transmit the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the UE described above in connection with FIG. 2. In some aspects, the transmission component 1304 may be co-located with the reception component 1302 in a transceiver.

The communication manager 140 may transmit or may cause the transmission component 1304 to transmit, to a network node, a first indication, associated with a sidelink communication, of at least one of whether sidelink carrier aggregation is supported or a first one or more component carriers associated with the sidelink communication. The communication manager 140 may receive or may cause the reception component 1302 to receive, from the network node based on transmitting the first indication, a second indication that a transmission associated with the sidelink communication is to be duplicated for multiple component carriers. The communication manager 140 may transmit or may cause the transmission component 1304 to transmit, based on the second indication, the sidelink communication via each of a plurality of component carriers that include at least one component carrier from the first one or more component carriers. In some aspects, the communication manager 140 may perform one or more operations described elsewhere herein as being performed by one or more components of the communication manager 140.

The communication manager 140 may include a controller/processor, a memory, or a combination thereof, of the UE described above in connection with FIG. 2. In some aspects, the communication manager 140 includes a set of components, such as an obtaining component 1308, or a combination thereof. Alternatively, the set of components may be separate and distinct from the communication manager 140. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The transmission component 1304 may transmit, to a network node, a first indication, associated with a sidelink communication, of at least one of whether sidelink carrier aggregation is supported or a first one or more component carriers associated with the sidelink communication. The reception component 1302 may receive, from the network node based on transmitting the first indication, a second indication that a transmission associated with the sidelink communication is to be duplicated for multiple component carriers. The transmission component 1304 may transmit, based on the second indication, the sidelink communication via each of a plurality of component carriers that include at least one component carrier from the first one or more component carriers.

The obtaining component 1308 may obtain, from an upper layer associated with the UE, information indicating at least one of whether sidelink carrier aggregation is supported or the first one or more component carriers, wherein the first one or more component carriers are associated with one or more sidelink service types.

The reception component 1302 may receive, from the network node, system information indicating that sidelink carrier aggregation is supported, wherein transmitting the first indication is based at least in part on receiving the system information.

The transmission component 1304 may transmit, to the network node, a sidelink buffer status report, wherein the sidelink buffer status report includes one or more channel busy ratio measurements associated with respective component carriers from the multiple component carriers.

The quantity and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally or alternatively, a set of (one or more) components shown in FIG. 13 may perform one or more functions described as being performed by another set of components shown in FIG. 13.

Figure 14:
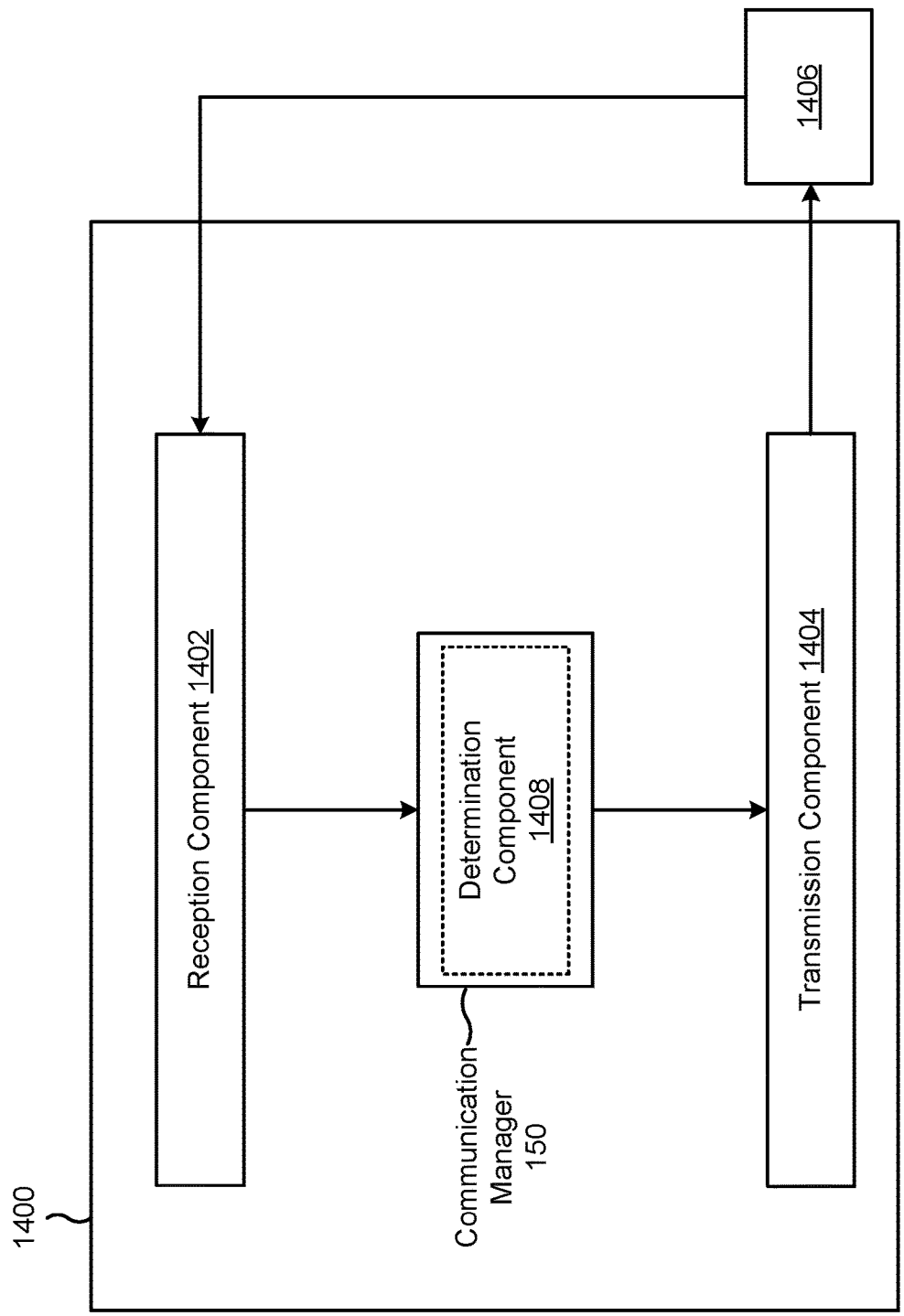
FIG. 14 is a diagram of an example apparatus for wireless communication in accordance with the present disclosure.

FIG. 14 is a diagram of an example apparatus 1400 for wireless communication in accordance with the present disclosure. The apparatus 1400 may be a network node, or a network node may include the apparatus 1400. In some aspects, the apparatus 1400 includes a reception component 1402, a transmission component 1404, and a communication manager 150, which may be in communication with one another (for example, via one or more buses). As shown, the apparatus 1400 may communicate with another apparatus 1406 (such as a UE, a network node, or another wireless communication device) using the reception component 1402 and the transmission component 1404.

In some aspects, the apparatus 1400 may be configured to perform one or more operations described herein in connection with FIGS. 8-10. Additionally or alternatively, the apparatus 1400 may be configured to perform one or more processes described herein, such as process 1200 of FIG. 12, or a combination thereof. In some aspects, the apparatus 1400 may include one or more components of the network node described above in connection with FIG. 2.

The reception component 1402 may receive communications, such as reference signals, control information, data communications, or a combination thereof, from the apparatus 1406. The reception component 1402 may provide received communications to one or more other components of the apparatus 1400, such as the communication manager 150. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1402 may include one or more antennas, a modem, a demodulator, a MIMO detector, a receive processor, a controller/processor, a memory, or a combination thereof, of the network node described above in connection with FIG. 2. In some aspects, the reception component 1402 may include or be included in an interface for communication with another apparatus, such as a network node.

The transmission component 1404 may transmit communications, such as reference signals, control information, data communications, or a combination thereof, to the apparatus 1406. In some aspects, the communication manager 150 may generate communications and may transmit the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the network node described above in connection with FIG. 2. In some aspects, the transmission component 1404 may be co-located with the reception component 1402 in a transceiver. In some aspects, the transmission component 1404 may include or be included in an interface for communication with another apparatus, such as a network node. In some aspects, the transmission component 1404 or the reception component 1402 may facilitate communication with one or more network nodes. For example, the transmission component 1404 or the reception component 1402 may not perform direct radio communication with a UE. In some other aspects, the transmission component 1404 or the reception component 1402 may perform direct radio communication with a UE.

The communication manager 150 may receive or may cause the reception component 1402 to receive one or more indications, associated with a sidelink communication and one or more UEs, of at least one of whether sidelink carrier aggregation is supported or a first one or more component carriers associated with the sidelink communication. The communication manager 150 may transmit or may cause the transmission component 1404 to transmit a communication intended for a UE of the one or more UEs indicating that a transmission associated with the sidelink communication is to be duplicated for multiple component carriers, the multiple component carriers including at least one component carrier from the first one or more component carriers. In some aspects, the communication manager 150 may perform one or more operations described elsewhere herein as being performed by one or more components of the communication manager 150.

The communication manager 150 may include a controller/processor, a memory, a scheduler, a communication unit, or a combination thereof, of the network node described above in connection with FIG. 2. In some aspects, the communication manager 150 includes a set of components, such as a determination component 1408, or a combination thereof. Alternatively, the set of components may be separate and distinct from the communication manager 150. In some aspects, one or more components of the set of components may include or may be implemented within a controller/processor, a memory, a scheduler, a communication unit, or a combination thereof, of the network node described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive one or more indications, associated with a sidelink communication and one or more UEs, of at least one of whether sidelink carrier aggregation is supported or a first one or more component carriers associated with the sidelink communication. The transmission component 1404 may transmit a communication intended for a UE of the one or more UEs indicating that a transmission associated with the sidelink communication is to be duplicated for multiple component carriers, the multiple component carriers including at least one component carrier from the first one or more component carriers.

The determination component 1408 may determine where transmissions associated with the sidelink communication are to be duplicated based on the one or more indications.

The transmission component 1404 may transmit system information indicating that sidelink carrier aggregation is supported, wherein receiving the indications is based at least in part on transmitting the system information.

The reception component 1402 may receive a sidelink buffer status report, wherein the sidelink buffer status report includes one or more channel busy ratio measurements associated with respective component carriers from the multiple component carriers.

The transmission component 1404 may transmit DCI communication scheduling the sidelink communication to be transmitted via a second one or more component carriers from the multiple component carriers, wherein the second one or more component carriers are selected based at least in part on the one or more channel busy ratio measurements.

The quantity and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by a user equipment (UE), comprising: transmitting, to a network node, a first indication, associated with a sidelink communication, of at least one of whether sidelink carrier aggregation is supported or a first one or more component carriers associated with the sidelink communication; receiving, from the network node based on transmitting the first indication, a second indication that a transmission associated with the sidelink communication is to be duplicated for multiple component carriers; and transmitting, based on the second indication, the sidelink communication via each of a plurality of component carriers that include at least one component carrier from the first one or more component carriers.

Aspect 2: The method of Aspect 1, further comprising obtaining, from an upper layer associated with the UE, information indicating at least one of whether sidelink carrier aggregation is supported or the first one or more component carriers, wherein the first one or more component carriers are associated with one or more sidelink service types.

Aspect 3: The method of any of Aspects 1-2, wherein the sidelink communication is a broadcast communication or a groupcast communication associated with a Layer 2 destination identifier.

Aspect 4: The method of any of Aspects 1-3, wherein the first indication is included in a sidelink UE information communication.

Aspect 5: The method of any of Aspects 1-4, wherein whether sidelink carrier aggregation is supported or the first one or more component carriers associated with the sidelink communication is based at least in part on a capability of the UE.

Aspect 6: The method of any of Aspects 1-5, wherein the first indication includes an indication that sidelink carrier aggregation is not supported for a second one or more component carriers, and wherein receiving the second indication is based at least in part on sidelink carrier aggregation not being supported for the second one or more component carriers.

Aspect 7: The method of any of Aspects 1-6, wherein the first indication is based at least in part on respective indications for a plurality of sidelink service types and respective component carriers associated with the plurality of sidelink service types.

Aspect 8: The method of any of Aspects 1-7, further comprising receiving, from the network node, system information indicating that sidelink carrier aggregation is supported, wherein transmitting the first indication is based at least in part on receiving the system information.

Aspect 9: The method of any of Aspects 1-8, wherein the second indication is included in a radio resource control communication.

Aspect 10: The method of Aspect 9, wherein the radio resource control communication indicates the multiple component carriers and includes an indication of a type of duplication to be associated with the multiple component carriers.

Aspect 11: The method of Aspect 10, wherein the type of duplication includes medium access control (MAC) layer duplication or packet data convergence protocol (PDCP) layer duplication.

Aspect 12: The method of any of Aspects 1-11, further comprising transmitting, to the network node, a sidelink buffer status report, wherein the sidelink buffer status report includes one or more channel busy ratio measurements associated with respective component carriers from the multiple component carriers.

Aspect 13: The method of any of Aspects 1-8 and 12, wherein the second indication is included in a downlink control information (DCI) communication that schedules the sidelink communication.

Aspect 14: The method of Aspect 13, wherein the DCI communication includes an indication of the plurality of component carriers.

Aspect 15: The method of Aspect 14, wherein the indication of the plurality of component carriers includes a bitmap, and wherein the bitmap includes a respective bit associated with each of the multiple component carriers.

Aspect 16: The method of any of Aspects 1-15, wherein the sidelink communication is associated with a transport block or a packet data convergence protocol (PDCP) packet, and wherein transmitting the sidelink communication comprises transmitting the transport block or the PDCP packet on each of the plurality of component carriers.

Aspect 17: A method of wireless communication performed by a network node, comprising: receiving one or more indications, associated with a sidelink communication and one or more user equipments (UEs), of at least one of whether sidelink carrier aggregation is supported or a first one or more component carriers associated with the sidelink communication; and transmitting a communication intended for a UE of the one or more UEs indicating that a transmission associated with the sidelink communication is to be duplicated for multiple component carriers, the multiple component carriers including at least one component carrier from the first one or more component carriers.

Aspect 18: The method of Aspect 17, wherein the sidelink communication is a broadcast communication or a groupcast communication associated with a Layer 2 destination identifier.

Aspect 19: The method of any of Aspects 17-18, wherein the indications are included in sidelink UE information communications.

Aspect 20: The method of any of Aspects 17-19, wherein the indication is based at least in part on a capability of the one or more UEs.

Aspect 21: The method of any of Aspects 17-20, wherein the indication includes an indication that sidelink carrier aggregation is not supported for a third one or more component carriers, and wherein transmitting the communication indicating that transmissions associated with the sidelink communication are to be duplicated for the multiple component carriers is based at least in part on sidelink carrier aggregation not being supported for the third one or more component carriers.

Aspect 22: The method of any of Aspects 17-21, further comprising transmitting system information indicating that sidelink carrier aggregation is supported, wherein receiving the indications is based at least in part on transmitting the system information.

Aspect 23: The method of any of Aspects 17-22, wherein the communication is included in a radio resource control communication.

Aspect 24: The method of Aspect 23, wherein the radio resource control communication indicates the multiple component carriers and an indication of a type of duplication to be associated with the multiple component carriers.

Aspect 25: The method of Aspect 24, wherein the type of duplication includes medium access control (MAC) layer duplication or packet data convergence protocol (PDCP) layer duplication.

Aspect 26: The method of any of Aspects 17-25, further comprising: receiving a sidelink buffer status report, wherein the sidelink buffer status report includes one or more channel busy ratio measurements associated with respective component carriers from the multiple component carriers; and transmitting downlink control information (DCI) communication scheduling the sidelink communication to be transmitted via a second one or more component carriers from the multiple component carriers, wherein the second one or more component carriers are selected based at least in part on the one or more channel busy ratio measurements.

Aspect 27: The method of any of Aspects 17-22 and 26, wherein the communication is included in a downlink control information (DCI) communication that schedules the sidelink communication.

Aspect 28: The method of Aspect 27, wherein the DCI communication includes an indication of a second one or more component carriers from the multiple component carriers.

Aspect 29: The method of Aspect 28, wherein the indication includes a bitmap, and wherein the bitmap includes a respective bit associated with each of the multiple component carriers.

Aspect 30: The method of any of Aspects 17-29, wherein receiving the indications comprises: receiving a first indication of the first one or more component carriers; and receiving a second indication of a second one or more component carriers that are supported for the sidelink communication by another UE of the one or more UEs; and wherein transmitting the communication is based at least in part on the first one or more component carriers and the second one or more component carriers being mutually exclusive.

Aspect 31: An apparatus for wireless communication at a device, comprising a processor; memory coupled with the processor; and instructions stored in the memory and executable by the processor to cause the apparatus to perform the method of one or more of Aspects 1-16.

Aspect 32: A device for wireless communication, comprising a memory and one or more processors coupled to the memory, the one or more processors configured to perform the method of one or more of Aspects 1-16.

Aspect 33: An apparatus for wireless communication, comprising at least one means for performing the method of one or more of Aspects 1-16.

Aspect 34: A non-transitory computer-readable medium storing code for wireless communication, the code comprising instructions executable by a processor to perform the method of one or more of Aspects 1-16.

Aspect 35: A non-transitory computer-readable medium storing a set of instructions for wireless communication, the set of instructions comprising one or more instructions that, when executed by one or more processors of a device, cause the device to perform the method of one or more of Aspects 1-16.

Aspect 36: An apparatus for wireless communication at a device, comprising a processor; memory coupled with the processor; and instructions stored in the memory and executable by the processor to cause the apparatus to perform the method of one or more of Aspects 17-30.

Aspect 37: A device for wireless communication, comprising a memory and one or more processors coupled to the memory, the one or more processors configured to perform the method of one or more of Aspects 17-30.

Aspect 38: An apparatus for wireless communication, comprising at least one means for performing the method of one or more of Aspects 17-30.

Aspect 39: A non-transitory computer-readable medium storing code for wireless communication, the code comprising instructions executable by a processor to perform the method of one or more of Aspects 17-30.

Aspect 40: A non-transitory computer-readable medium storing a set of instructions for wireless communication, the set of instructions comprising one or more instructions that, when executed by one or more processors of a device, cause the device to perform the method of one or more of Aspects 17-30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A user equipment (UE) for wireless communication, comprising:
    at least one memory; and
    at least one processor communicatively coupled with the at least one memory, the at least one processor configured to cause the UE to:
        transmit, to a network node, a first indication, associated with a sidelink communication, of whether sidelink carrier aggregation is supported;
        receive, from the network node based on the first indication, a second indication that a transmission associated with the sidelink communication is to be duplicated for multiple component carriers; and
        transmit, based on the second indication, the sidelink communication via each of a plurality of component carriers.

2. The UE of claim 1, wherein the at least one processor is further configured to cause the UE to obtain, from an upper layer associated with the UE, information indicating at least one of whether sidelink carrier aggregation is supported or a first one or more component carriers associated with the sidelink communication, wherein the first one or more component carriers are associated with one or more sidelink service types.

3. The UE of claim 1, wherein the sidelink communication is a broadcast communication or a groupcast communication associated with a Layer 2 destination identifier.

4. The UE of claim 1, wherein the first indication is included in a sidelink UE information communication.

5. The UE of claim 1, wherein whether sidelink carrier aggregation is supported is based at least in part on a capability of the UE.

6. The UE of claim 1, wherein the first indication includes an indication that sidelink carrier aggregation is not supported for one or more component carriers, and
    wherein the at least one processor, to cause the UE to receive the second indication, is configured to cause the UE to receive the second indication based at least in part on sidelink carrier aggregation not being supported for the one or more component carriers.

7. The UE of claim 1, wherein the first indication is based at least in part on respective indications for a plurality of sidelink service types and respective component carriers associated with the plurality of sidelink service types.

8. The UE of claim 1, wherein the second indication is included in a radio resource control communication that indicates the multiple component carriers and includes an indication of a type of duplication to be associated with the multiple component carriers.

9. The UE of claim 1, wherein the at least one processor is further configured to cause the UE to transmit, to the network node, a sidelink buffer status report, wherein the sidelink buffer status report includes one or more channel busy ratio measurements associated with respective component carriers from the multiple component carriers.

10. The UE of claim 1, wherein the second indication is included in a downlink control information (DCI) communication that schedules the sidelink communication.

11. The UE of claim 10, wherein the DCI communication includes an indication of the plurality of component carriers, wherein the indication of the plurality of component carriers includes a bitmap, and wherein the bitmap includes a respective bit associated with each of the multiple component carriers.

12. The UE of claim 1, wherein the first indication indicates one or more component carriers associated with the sidelink communication, and wherein the plurality of component carriers includes at least one component carrier of the one or more component carriers.

13. A network node for wireless communication, comprising:
at least one memory; and
at least one processor communicatively coupled with the at least one memory, the at least one processor configured to cause the network node to:
receive one or more indications, associated with a sidelink communication and one or more user equipments (UEs), of whether sidelink carrier aggregation is supported; and
transmit a communication intended for a UE of the one or more UEs indicating that a transmission associated with the sidelink communication is to be duplicated for multiple component carriers.

14. The network node of claim 13, wherein the at least one processor is further configured to cause the network node to transmit system information indicating that sidelink carrier aggregation is supported; and
wherein the at least one processor, to cause the network node to receive the one or more indications, is configured to cause the network node to receive the one or more indications based at least in part on the system information.

15. The network node of claim 13, wherein the at least one processor is further configured to cause the network node to:
receive a first indication of a first one or more component carriers that are supported for the sidelink communication by the UE; and
receive a second indication of a second one or more component carriers that are supported for the sidelink communication by another UE of the one or more UEs; and
wherein the at least one processor, to cause the network node to transmit the communication, is configured to cause the network node to transmit the communication based at least in part on the first one or more component carriers and the second one or more component carriers being mutually exclusive, wherein the multiple component carriers includes at least one component carrier from the first one or more component carriers.

16. A method of wireless communication performed by a user equipment (UE), comprising:
transmitting, to a network node, a first indication, associated with a sidelink communication, of whether sidelink carrier aggregation is supported;
receiving, from the network node based on transmitting the first indication, a second indication that a transmission associated with the sidelink communication is to be duplicated for multiple component carriers; and
transmitting, based on the second indication, the sidelink communication via each of a plurality of component carriers.

17. The method of claim 16, further comprising obtaining, from an upper layer associated with the UE, information indicating at least one of whether sidelink carrier aggregation is supported or a first one or more component carriers associated with the sidelink communication, wherein the first one or more component carriers are associated with one or more sidelink service types.

18. The method of claim 16, wherein the sidelink communication is a broadcast communication or a groupcast communication associated with a Layer 2 destination identifier.

19. The method of claim 16, wherein the first indication is included in a sidelink UE information communication.

20. The method of claim 16, wherein whether sidelink carrier aggregation is supported is based at least in part on a capability of the UE.

21. The method of claim 16, wherein the first indication includes an indication that sidelink carrier aggregation is not supported for one or more component carriers, and wherein receiving the second indication is based at least in part on sidelink carrier aggregation not being supported for the one or more component carriers.

22. The method of claim 16, wherein the first indication is based at least in part on respective indications for a plurality of sidelink service types and respective component carriers associated with the plurality of sidelink service types.

23. The method of claim 16, wherein the second indication is included in a radio resource control communication that indicates the multiple component carriers and includes an indication of a type of duplication to be associated with the multiple component carriers.

24. The method of claim 16, further comprising transmitting, to the network node, a sidelink buffer status report, wherein the sidelink buffer status report includes one or more channel busy ratio measurements associated with respective component carriers from the multiple component carriers.

25. The method of claim 16, wherein the second indication is included in a downlink control information (DCI) communication that schedules the sidelink communication.

26. The method of claim 25, wherein the DCI communication includes an indication of the plurality of component carriers, wherein the indication of the plurality of component carriers includes a bitmap, and wherein the bitmap includes a respective bit associated with each of the multiple component carriers.

27. The method of claim 16, wherein the first indication indicates one or more component carriers associated with the sidelink communication, and wherein the plurality of component carriers includes at least one component carrier of the one or more component carriers.

28. A method of wireless communication performed by a network node, comprising:
receiving one or more indications, associated with a sidelink communication and one or more user equipments (UEs), of whether sidelink carrier aggregation is supported; and
transmitting a communication intended for a UE of the one or more UEs indicating that a transmission associated with the sidelink communication is to be duplicated for multiple component carriers.

29. The method of claim 28, further comprising transmitting system information indicating that sidelink carrier aggregation is supported, wherein receiving the one or more indications is based at least in part on transmitting the system information.

30. The method of claim 28, further comprising:
- receiving a first indication of a first one or more component carriers that are supported for the sidelink communication by the UE; and
- receiving a second indication of a second one or more component carriers that are supported for the sidelink communication by another UE of the one or more UEs; and
- wherein transmitting the communication is based at least in part on the first one or more component carriers and the second one or more component carriers being mutually exclusive, wherein the multiple component carriers includes at least one component carrier from the first one or more component carriers.

* * * * *